United States Patent
Tsukahara et al.

(10) Patent No.: US 10,506,113 B2
(45) Date of Patent: Dec. 10, 2019

(54) IMAGE PROCESSING APPARATUS INCLUDING A MAIN DEVICE AND AN OPERATION DEVICE RECEIVING SETTING INFORMATION FOR SCANNING

(71) Applicants: Mina Tsukahara, Kanagawa (JP); Noboru Uemura, Kanagawa (JP)

(72) Inventors: Mina Tsukahara, Kanagawa (JP); Noboru Uemura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/208,622

(22) Filed: Dec. 4, 2018

(65) Prior Publication Data
US 2019/0191037 A1    Jun. 20, 2019

(30) Foreign Application Priority Data

Dec. 15, 2017 (JP) ................................ 2017-240631
Jul. 5, 2018 (JP) ................................ 2018-128593

(51) Int. Cl.
*H04N 1/32* (2006.01)
*H04N 1/00* (2006.01)
*G06F 15/00* (2006.01)

(52) U.S. Cl.
CPC ....... *H04N 1/0035* (2013.01); *H04N 1/00087* (2013.01); *H04N 1/00779* (2013.01)

(58) Field of Classification Search
CPC ............. H04N 1/0035; H04N 1/00087; H04N 1/00779
USPC ........................ 358/442, 1.1, 1.15, 1.14, 1.13
See application file for complete search history.

(56) References Cited

U.S. PATENT DOCUMENTS

| 2007/0182982 | A1* | 8/2007 | Hayashida ........... H04N 1/0035 358/1.14 |
| 2012/0320431 | A1* | 12/2012 | Kanaya .............. H04N 1/00411 358/474 |
| 2013/0128299 | A1 | 5/2013 | Utoh et al. |
| 2013/0156457 | A1 | 6/2013 | Tsukahara et al. |
| 2015/0043026 | A1 | 2/2015 | Soyama et al. |
| 2017/0255992 | A1 | 9/2017 | Han |
| 2018/0247553 | A1 | 8/2018 | Uemura et al. |

FOREIGN PATENT DOCUMENTS

| JP | 2002-010059 | 1/2002 |
| JP | 2009-100211 | 5/2009 |
| JP | 2016-085659 | 5/2016 |

* cited by examiner

*Primary Examiner* — Douglas Q Tran
(74) *Attorney, Agent, or Firm* — Oblon, McClelland, Maier & Neustadt, L.L.P.

(57) ABSTRACT

An image processing apparatus includes a main device including at least a scanner and an operation device including circuitry configured to operate the main device. The circuitry receives setting information and an instruction of scanning a document using the scanner, which are input to the operation device, stores at least the setting information in a memory of the operation device, in response to receiving the setting information, transmits, to the main device, a request for scanning the document using the scanner, in response to receiving the instruction of scanning the document, acquires an image of the document, which is scanned by the scanner in the main device that receives the request for scanning the document, from the main device as scanned image data, and processes the acquired scanned image data based on the setting information stored in the memory.

19 Claims, 21 Drawing Sheets

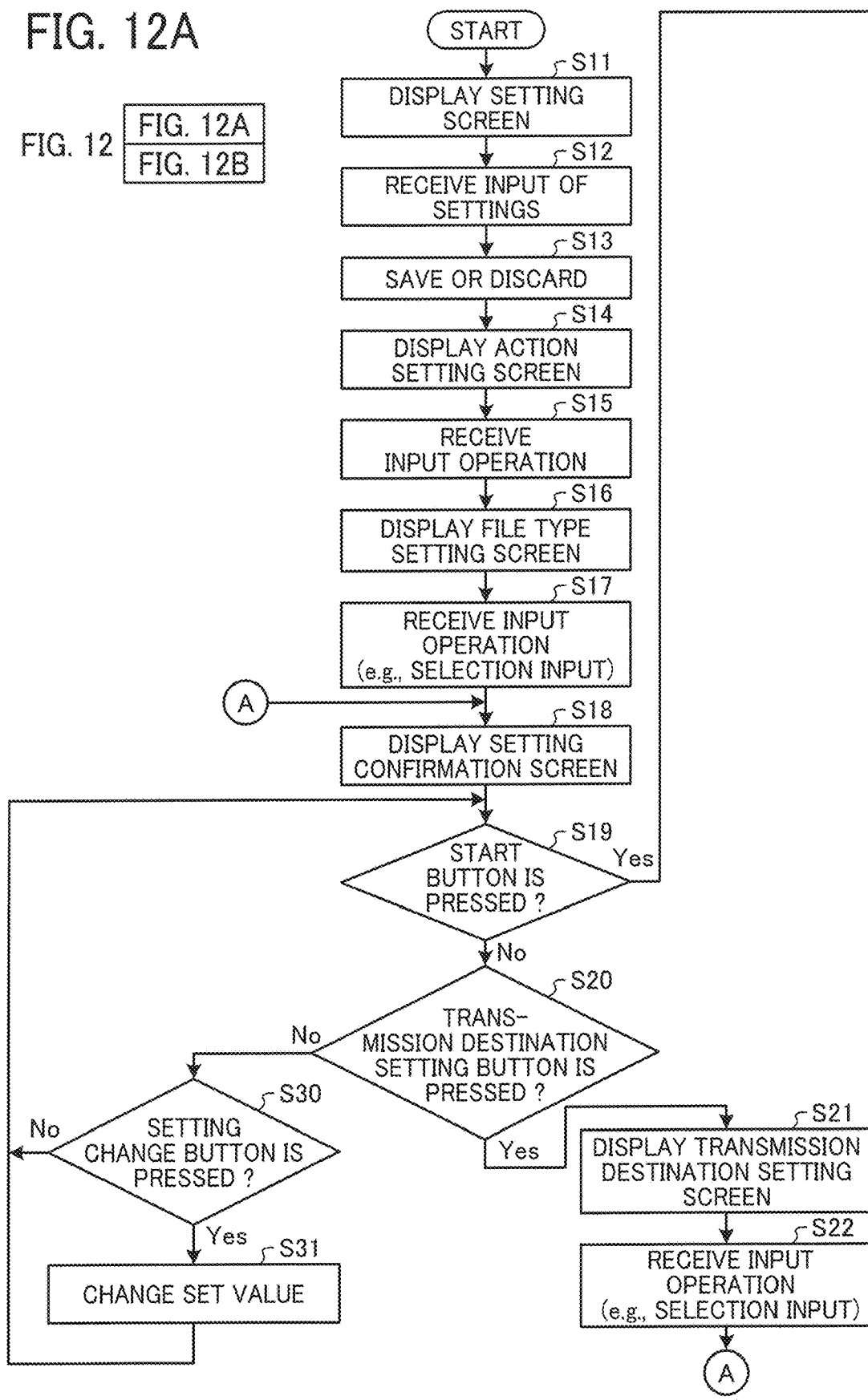

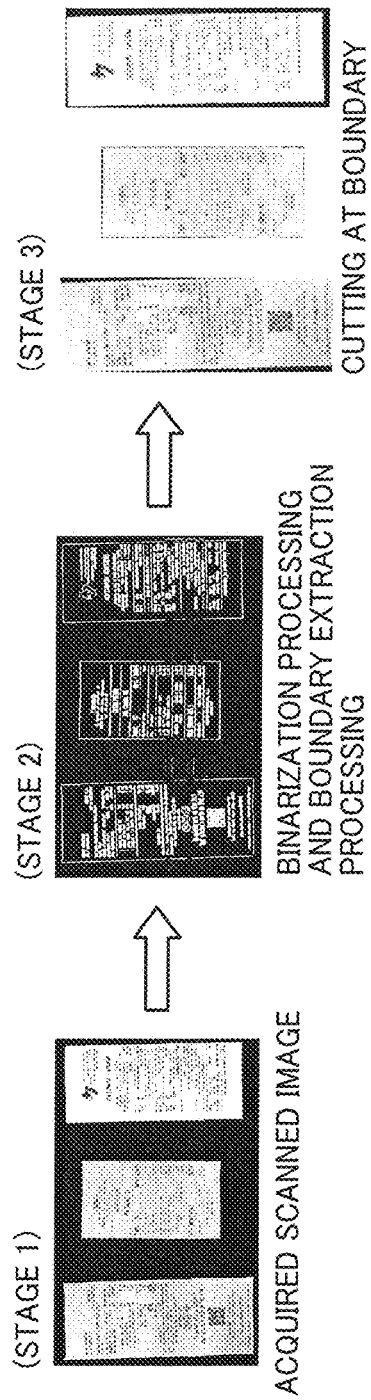

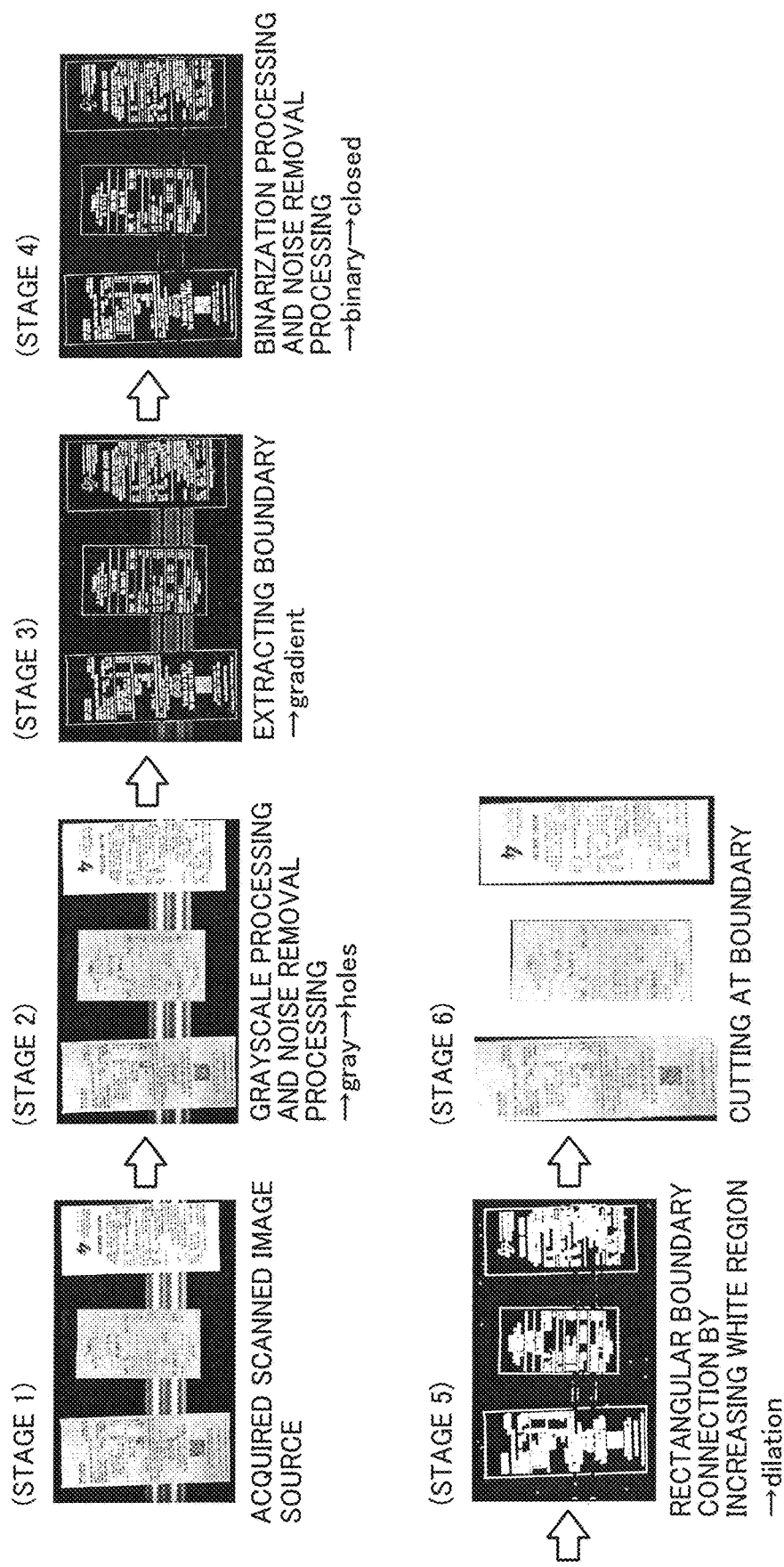

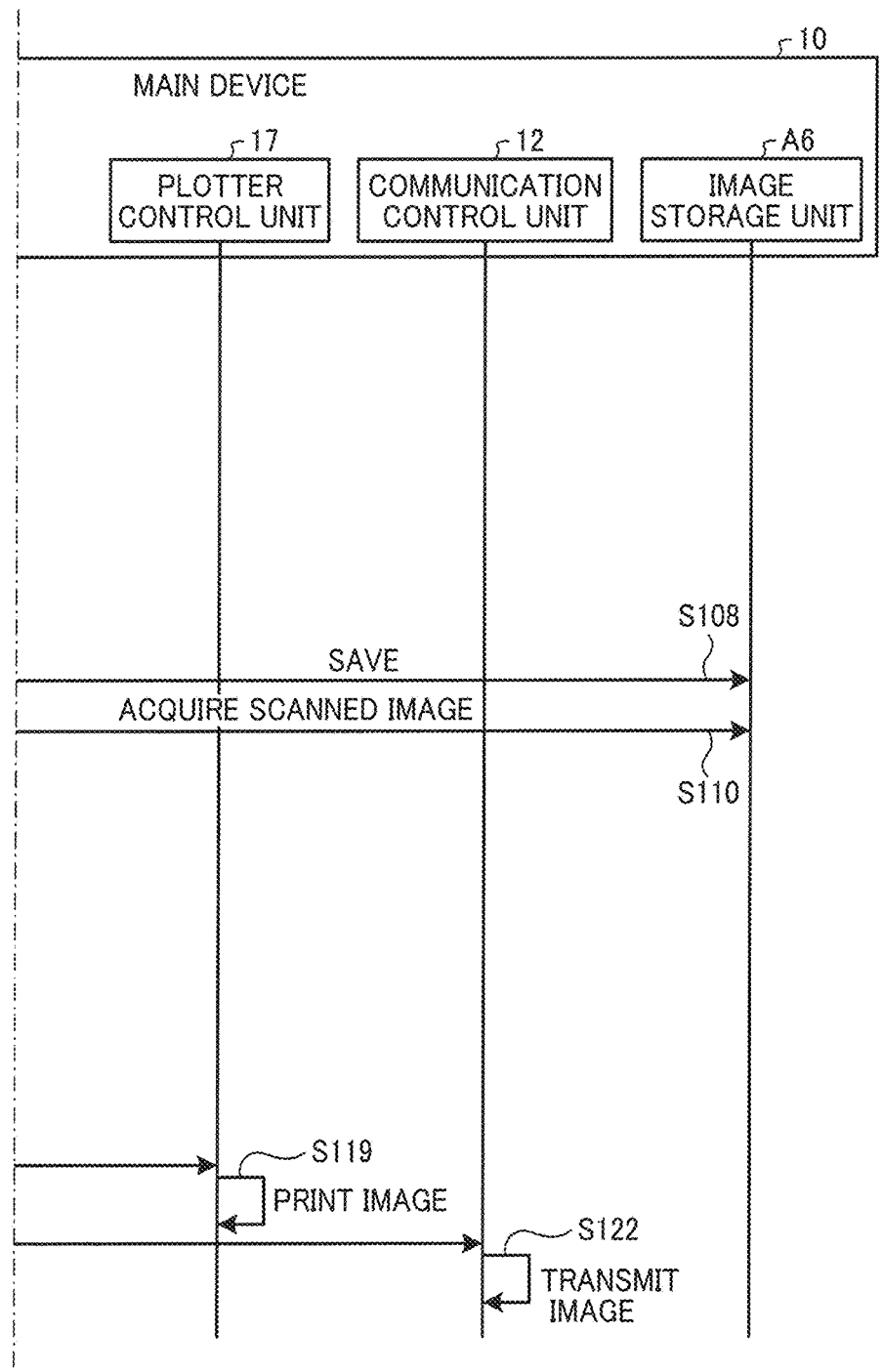

IMAGE PROCESSING APPARATUS INCLUDING A MAIN DEVICE AND AN OPERATION DEVICE RECEIVING SETTING INFORMATION FOR SCANNING

CROSS-REFERENCE TO RELATED APPLICATION

This application claims priority pursuant to 35 U.S.C. § 119(a) to Japanese Patent Application Nos. 2017-240631, filed on Dec. 15, 2017, and 2018-128593, filed on Jul. 5, 2018 in the Japan Patent Office, the disclosure of which is incorporated by reference herein in its entirety.

BACKGROUND

Technical Field

This disclosure relates to an image processing apparatus, an image processing system, and a method of processing image data.

Background Art

Conventionally, when documents are scanned, users use operation panels mounted on image processing apparatuses (e.g., scanner, multi-functional peripherals (MFPs)) to set color type and resolution level for scanning the documents. Then, the image processing apparatuses scan document image based on the settings set by users, and output scanned data.

Some image processing apparatuses output the scanned image data by performing image processing associated with the scanning. For example, in one technique, a plurality of documents (e.g., business cards) placed on a plate is scanned collectively, and then scanned image data of the business cards is output by cutting-out the business card images and correcting the inclination of the business card images

SUMMARY

In one aspect of the present invention, an image processing apparatus is devised. The image processing apparatus includes a main device including at least a scanner and an operation device, which is configured to operate the main device and includes circuitry. The circuitry receives setting information and an instruction of scanning a document using the scanner, which are input to the operation device, stores at least the setting information in a memory of the operation device, in response to receiving the setting information, transmits, to the main device, a request for scanning the document using the scanner, in response to receiving the instruction of scanning the document, acquires an image of the document, which is scanned by the scanner in the main device that receives the request for scanning the document, from the main device as scanned image data, and processes the acquired scanned image data based on the setting information stored in the memory.

In another aspect of the present invention, an image processing system is devised. The image processing system includes an image processing apparatus including at least a scanner, and an information processing apparatus communicable with the image processing apparatus to operate the image processing apparatus. The information processing apparatus includes circuitry. The circuitry receives setting information and an instruction of scanning a document using the scanner, input to the information processing apparatus, stores at least the setting information in a memory of the information processing apparatus, in response to receiving the setting information, transmits, to the image processing apparatus, a request for scanning the document using the scanner, in response to receiving the instruction of scanning the document, acquires an image of the document, scanned by the scanner in the image processing apparatus that receives the request for scanning the document, from the image processing apparatus as scanned image data, and processes the acquired scanned image data based on the setting information stored in the memory of the information processing apparatus.

In another aspect of the present invention, a method of processing image data an operation apparatus communicable with an image processing apparatus including at least a scanner is devised. The method includes receiving setting information and an instruction of scanning a document using the scanner of the image processing apparatus, input to the operation apparatus, storing at least the setting information in a memory of the operation apparatus, in response to receiving the setting information, transmitting, to the image processing apparatus, a request for scanning the document using the scanner, in response to receiving the instruction of scanning the document, acquiring an image of the document, scanned by the scanner in the image processing apparatus that receives the request for scanning the document, from the image processing apparatus as scanned image data, and processing the acquired scanned image data based on the setting information stored in the memory.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 12A and 12B (FIG. 12) are an example of a flow chart illustrating the steps of processing at an operation panel;

FIG. 14A illustrates an example of procedure of image processing when filtering process is turned OFF;

FIG. 14B illustrates an example of procedure of image processing when filtering process is turned ON;

FIGS. 15A and 15B (FIG. 15) are an example of a sequence diagram of an operation performed at an MFP;

Figure 1:
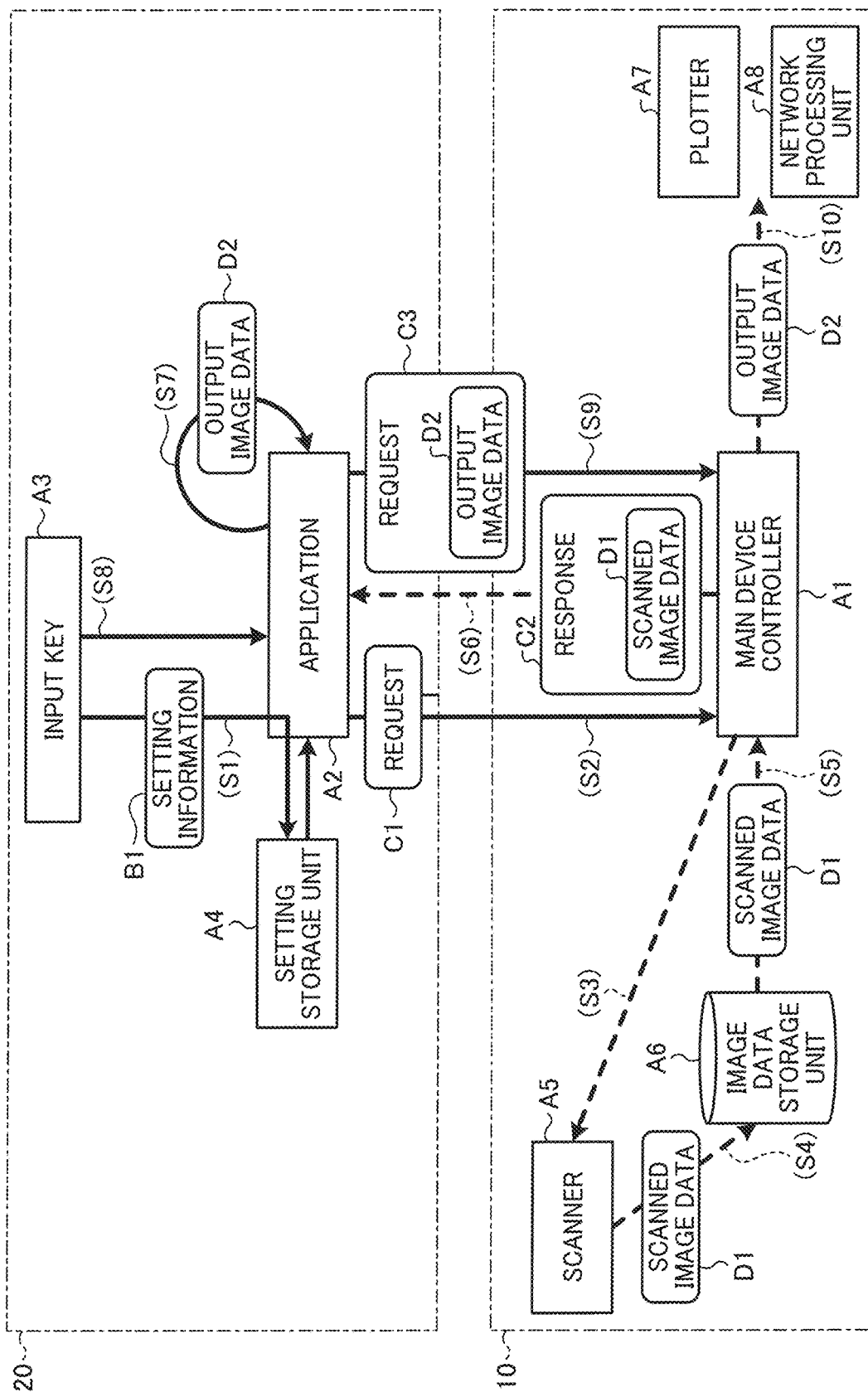
FIG. 1 illustrates a scheme of an image processing performable by an image processing apparatus or an image processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an image processing apparatus, an image processing system, a method, and a program according to the present invention in detail with reference to the accompanying drawings. In this specification, the image processing apparatus and the image processing system are described using a multifunction peripheral (MFP) as an example of the image processing apparatus and the image processing system.

In this specification, the image processing apparatus includes a main device having a scanner, and an operation device configured to operate the main device. The operation device includes, for example, an reception unit for receiving setting information and an instruction of scanning a document (document scanning instruction) using the scanner, an input to the operation device, a storage control unit for storing at least the setting information in a storage area of the operation device in response to receiving the setting information, a request unit for transmitting a request for scanning the document to the main device in response to receiving the instruction of scanning the document, and a processing unit for acquiring an image, scanned by the main device from the main device as scanned image data, and for processing the scanned image data based on the setting information stored in the storage area. The image processing apparatus described in this specification is just one example, and not limited thereto.

FIG. 1 illustrates a scheme of an image processing performable by an image processing apparatus and an image processing system according to an embodiment. As illustrated in FIG. 1, the image processing is performed by the image processing apparatus or the image processing system using, for example, a main device controller A1, an application A2, an input key A3, a setting storage unit A4, a scanner A5, an image data storage unit A6, a plotter A7, and a network processing unit A8. The plotter A7 can be omitted from the configuration of the image processing apparatus or image processing system. Further, functions other than the plotter A7 can be included in the configuration of the image processing apparatus or image processing system.

As illustrated in FIG. 1, an MFP includes a main device 10 and an operation device 20 that is configured to operate the main device 10. For example, the main device 10 includes the main device controller A1, the scanner A5, the image data storage unit A6, the plotter A7, and the network processing unit A8 while the operation device 20 includes the application A2, the input key A3, and the setting storage unit A4. Further, the network processing unit A8 can be provided in the operation device 20 alone or can be provided in both the main device 10 and the operation device 20.

The main device controller A1 is a controller of the main device 10 of the MFP. The application A2, which is operable in the operation device 20, performs the image processing on scanned image data D1, to be described later, and outputs the scanned image data D1 having received the image processing as output image data D2.

The input key A3, which is a part of an "input unit" or "reception unit" receives an input from a user at the operation device 20. The input key A3 indicates, for example, hardware keys provided on the operation device 20, and software keys provided by the application A2 on an operation screen. The setting storage unit A4 is a storage area for storing setting information B1 indicating an output style or format of an image corresponding to the output image data D2.

The scanner A5 is a scanner (also referred to as a "reader") that scans document image. The scanning or reading of document image by the scanner A5 is also referred to as "scan" or "scanning." The image data storage unit A6 is a storage area for storing or saving the scanned image data D1 acquired by performing the scanning using the scanner A5. In this description, the scanned image data D1 means image data generated by performing a scanning on a document and may be also referred to as "scan image data," "acquired scanned image data," "initial scanned image data," or "primary scanned image data." The plotter A7, which is an example of an "image forming unit," forms an image corresponding to the output image data D2, generated and output by the application A2, on a recording medium such as a sheet. The network processing unit A8 transmits the output image data D2, generated and output by the application A2, to another device or apparatus disposed on the network.

In the configuration illustrated in FIG. 1, at first, when a user performs an input operation using the input key A3, the user sets the setting information B1 indicating an output style or format of the scanned image data D1 in the setting storage unit A4 used by the application A2, and then the user instructs to start a scanning operation (step S1). That is, the user inputs the setting information B1, an instruction of scanning a document (document scanning instruction, scanning instruction), and an instruction of execution of scanning the document (scanning execution instruction) by performing the input operation using the input key A3.

In response to receiving the instruction of starting the scanning operation, the application A2 transmits a request C1 to the main device controller A1 (step S2). The application A2 transmits the request C1 to request the main device controller A1 to perform the scanning operation and to fetch or acquire the scanned image data D1 from the main device controller A1. Hereinafter, "fetch" may be referred to as "acquire."

In response to receiving the request C1, the main device controller A1 transmits a signal to the scanner A5 to cause the scanner A5 to scan the document (step S3) and then stores the scanned image data D1 output from the scanner A5 in the image data storage unit A6 (step S4).

When the scanning operation of document is completed, the main device controller A1 reads out the scanned image data D1 from the image data storage unit A6 (step S5) and then the main device controller A1 transfers the scanned image data D1 to the application A2 as a response C2, which is a response to the request C1 (step S6).

Then, the application A2 performs the image processing on the scanned image data D1 acquired from the main device 10 based on the setting information B1 stored in the setting storage unit A4 to generate the output image data D2 (step S7).

Then, the user operates the input key A3 to input an instruction of outputting the output image data D2 (step S8).

In response to receiving the instruction of outputting the output image data D2 (step S8), the application A2 transmits a request C3 to the main device controller A1 based on the setting information B1 to instruct the main device controller A1 to output the output image data D2 (step S9).

In response to receiving the request C3, the main device controller A1 outputs the output image data D2 to an output destination such as the plotter A7 and/or the network processing unit A8 corresponding to the request C3 (step S10).

First Embodiment

Figure 2:
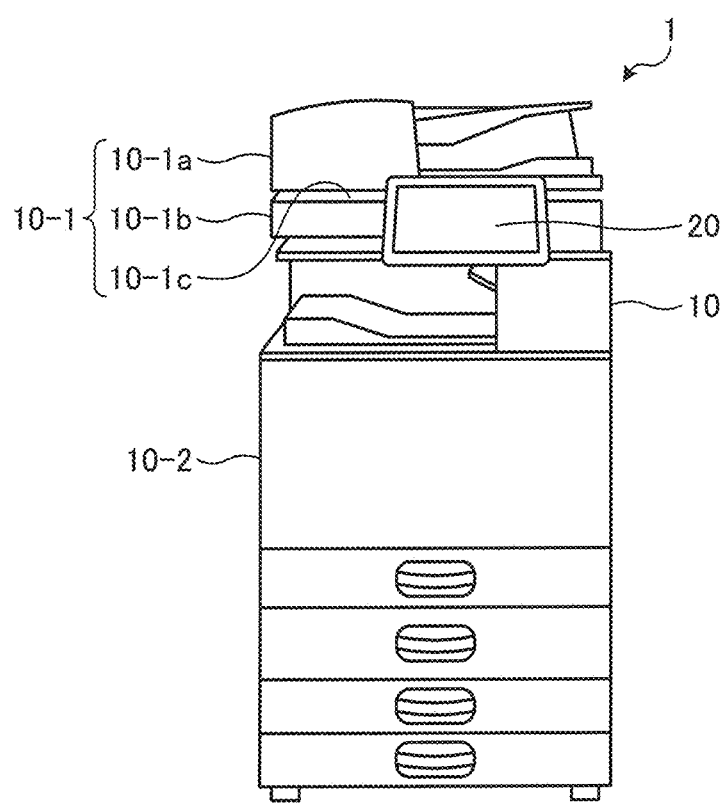
FIG. 2 illustrates an external configuration of an MFP used as an example of the image processing apparatus of a first embodiment.

FIG. 2 illustrates an external configuration of the MFP used as an example of the image processing apparatus of a first embodiment. In this specification, the image processing apparatus includes at least a scanning function. In this specification, the MFP equipped with a scanning function and a printing function, which are examples of the image forming functions, is described. Further, the MFP may include the main device 10 and the operation device 20 integrally as illustrated in FIG. 2.

As illustrated in FIG. 2, the main device 10 includes, for example, a scanner unit 10-1 and an image forming unit 10-2. The scanner unit 10-1 scans or reads document while the image forming unit 10-2 performs an image forming operation that forms or prints an image on a recording medium, such as a sheet. The scanner unit 10-1 and the image forming unit 10-2 are operated under the control of the controller of the main device 10. In this description, the scanner unit 10-1 corresponds to the scanner A5, the image forming unit 10-2 corresponds to the plotter A7, and the controller of the main device 10 corresponds to the main device controller A1. Further, a hard disk drive (HDD) 103 (see FIG. 3), which will be described later, can implement the image data storage unit A6.

As illustrated in FIG. 2, the scanner unit 10-1 includes, for example, an auto document feeder (ADF) 10-1a and a scanner 10-1b. The ADF 10-1a is an example of a document pressing plate provided above a face (i.e., scan face, contact face) of a contact glass 10-1c used for scanning a document. The ADF 10-1a can be opened from the contact glass 10-1c to expose the scan face externally and can be closed over the contact glass 10-1c to block an external light from entering to the scan face of the contact glass 10-1c. By lifting one side of the ADF 10-1a upward, the scan face of the contact glass 10-1c is exposed to the outside, and in this opened condition, the document can be directly placed on the scan face of the contact glass 10-1c exposed to the outside (placement of document). When the opened ADF 10-1a is moved to downward and closed on the scan face of the contact glass 10-1c, the ADF 10-1a functions as the document pressing plate, in which light coming from the external light source can be blocked by the closed ADF 10-1a.

The scanner 10-1b disposed below the contact glass 10-1c includes, for example, an illumination device, an image sensor such as charge coupled device (CCD) image sensor or complementary metal oxide semiconductor (CMOS) image sensor, an optical system for focusing an image of document on the image sensor. The scanner 10-1b emits light to illuminate the document and the document pressing plate (specifically, a rear cover located on the back of the document) through the contact glass 10-1c using the illumination device, and converts the light reflected from the document surface and the rear cover and focused on the image sensor via the optical system into an electrical signal such as RAW image data.

The image forming unit 10-2 includes, for example, an optical writing device, a tandem imaging unit, a transfer belt, and a fixing device to form or print an image on a recording sheet supplied from a sheet supply cassette, disposed at a lower portion, using a toner or the like.

Hereinafter, the operation device 20 may be referred to as the operation panel 20, which includes, for example, the application A2 (FIG. 1) and the setting storage unit A4 (FIG. 1). In response to receiving a user operation, the application A2 instructs the main device 10 to execute one or more functions and the application A2 sets the setting information B1 in the setting storage unit A4. For example, when a scan start button is pressed, the application A2 requests the controller of the main device 10 to execute a scanning operation. Further, the operation panel 20 acquires the scanned image data D1 generated by performing the scanning operation from the main device 10, performs the image processing on the scanned image data D1 based on the setting information B1 stored in the setting storage unit A4 to generate the output image data D2, and outputs the output image data D2 to the output destination specified in the setting information B1. Depending on the output destination of the output image data D2, for example, the application A2 requests the main device 10 to execute printing of the output image data D2, to save the output image data D2 in a storage medium or to transmit the output image data D2 to another device. The operation panel 20 is connected to the controller of the main device 10 using short range communication technologies by wire and/or wirelessly, in which the operation panel 20 transmits an operation signal to the controller of the main device 10 via a communication path 30 (see FIG.

3) and communicates information and data such as request, response, and image data with the controller of the main device 10.

In the first embodiment, when the operation panel 20 uses a function of the main device 10, an application programming interface (API) of the main device 10 provides the function to the operation panel 20, and the operation panel 20 operates the API to use the function of the main device 10, such as scanning and printing.

In this description, the API means, for example, a web API. Unless otherwise stated, the API is assumed to be a web API such as a web API of Representational State Transfer (REST). The web API of REST transmits methods of GET (acquire), POST (register), PUT (update) and DELETE (delete), and a request (or "request target data") using a uniform resource locator (URL) identifying a resource to a world wide web server (web server) installed on the controller of the main device 10 from the operation panel 20, and then the operation panel 20 receives a response (or "response data") from the web server using JavaScript (registered trademark) Object Notation (JSON) and extensible markup language (XML).

Figure 3:
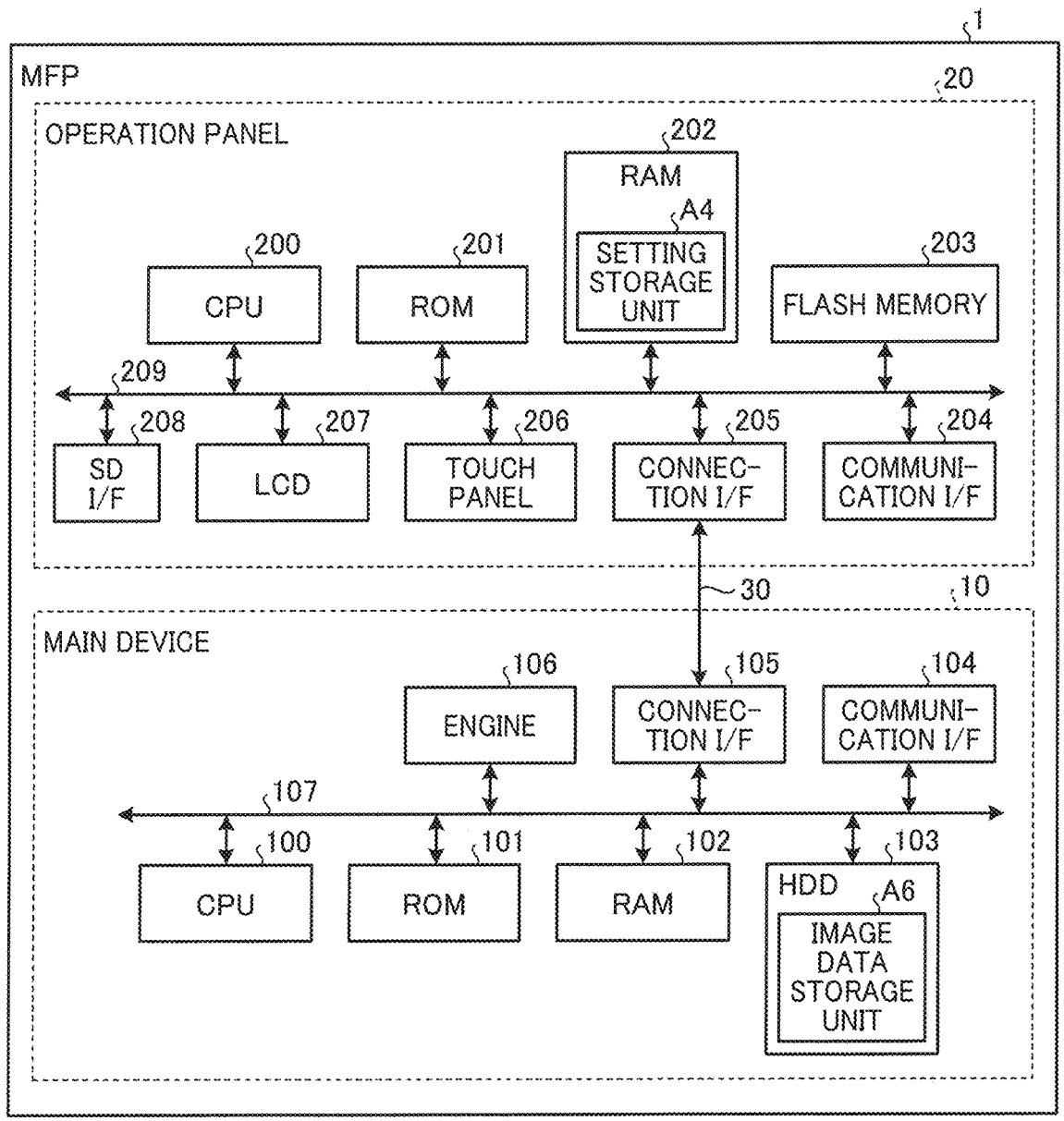
FIG. 3 illustrates an example of a hardware block diagram of an MFP.

Hardware Configuration:

FIG. 3 illustrates an example of a hardware block diagram of the MFP 1. As illustrated in FIG. 3, the controller of the main device 10 includes, for example, a central processing unit (CPU) 100 used as a first CPU, a read only memory (ROM) 101, a random access memory (RAM) 102, a hard disk drive (HDD) 103, a communication interface (I/F) 104, a connection interface (I/F) 105, and an engine 106. Each of the components is connected to each other via a system bus 107.

The CPU 100 is a central processing unit that executes computing such as calculation processing and control processing. The CPU 100 reads various programs stored in the ROM 101, the HDD 103, and the like onto the RAM 102 and executes the calculation processing and the control processing to control the main device 10 entirely.

The ROM 101 is a nonvolatile memory that stores a program, such as basic input/output system (BIOS). The RAM 102 is a volatile memory used by the CPU 100 as a work area for performing various processing. The HDD 103 is an auxiliary storage device for storing various programs, data, and the like. The various programs include, for example, an operating system (OS) dedicated to the multi-functional apparatus such as MFP, a web server software, a web API, and the like. Further the HDD 103 implements the image data storage unit A6 to store the scanned image data D1 (see FIG. 1) of the document generated and acquired by performing the scanning operation.

The communication I/F 104 is an interface, such as Ethernet (registered trademark) board, for connecting the main device 10 to a communication network, such as a local area network (LAN) and a virtual private network (VPN).

The connection I/F 105 is an interface for short-range communication, such as a universal serial bus (USB) standard, which is connected to the operation panel 20 for performing communication via the communication path 30. Further, the connection to the operation panel 20 is not limited to the USB standard. Further, the communication path 30 may not be limited to wired communication, but the communication path 30 can be wireless communication.

The engine 106 includes, for example, an engine of the scanner 10-1b configured in the scanner unit 10-1 (FIG. 2) and an engine of the plotter A7 configured in the image forming unit 10-2 (FIG. 2). The scanner 10-1b emits light to a document face placed on the contact glass 10-1c (FIG. 2) and converts the light reflected from the document face into electrical signals using a red, green, and blue (RGB) color sensor such as CCD or CMOS sensors. The signals converted into electrical signals are output as digital signals (e.g., joint photographic experts group (JPEG) image) after receiving signal amplification and analog/digital (A/D) conversion, and compression by a JPEG compression unit. The JPEG image is an example of the scanned image data D1.

As illustrated in FIG. 3, the operation panel 20 includes, for example, a CPU 200 used as a second CPU provided independently from the main device 10, a ROM 201, a RAM 202, a flash memory 203, a communication I/F 204, a connection I/F 205, a touch panel 206, a liquid crystal display (LCD) 207, and secure digital (SD) I/F 208. Each of the components is connected to each other via a system bus 209.

The CPU 200 is a central processing unit that executes computing such as calculation processing and control processing. The CPU 200 reads various programs stored in the ROM 201, the flash memory 203, and the like onto the RAM 202, and performs the calculation processing and the control processing to control the operation panel 20 entirely.

The ROM 201 is a nonvolatile memory that stores a program (e.g., BIOS). The RAM 202 is a volatile memory used by the CPU 200 as a work area for performing various processing. The setting storage unit A4 used for saving or storing the setting information B1 (FIG. 1) is implemented using a part of the RAM 202. The flash memory 203 is an auxiliary storage device that stores a general-purpose OS (e.g., Android (registered trademark) OS) different from the OS installed on the main device 10, and the application A2 (e.g., Android application) operated by the CPU 200 under the control of the general-purpose OS used as a second OS in this description. The setting information B1 in the setting storage unit A4 is stored in the flash memory 203 and read out from the setting storage unit A4 to use in the next time operation. The general-purpose OS of the operation panel 20 operates independently from an operating system (OS) dedicated to a multifunctional apparatus installed on the main device 10 used as a first OS in this description. The application A2 is stored in the flash memory 203 as an application that is operable under the control of the general-purpose OS of the operation panel 20. The application A2 is an application that can be added to the general-purpose OS.

The communication I/F 204 is an interface for connecting the operation panel 20 to a communication network such as LAN and VPN.

The connection IN 205 is an interface for short-range communication, such as a universal serial bus (USB) standard, which is connected to the main device 10 for performing communication via the communication path 30.

The touch panel 206 detects a position on a screen of the LCD 207 touched by an operator such as a user and notifies information of the touched position (position information) to the CPU 200, in which the touch panel 206 includes a touch sensor. In addition to the touch panel 206, hardware keys for inputting values, commands, and the like to the CPU 200 can be provided.

The LCD 207 is an example of a display. The LCD 207, having a liquid crystal display, displays screen information output by the CPU 200 on the liquid crystal display. The display can employ any display, such as an organic electroluminescence (OEL) display in addition to the liquid crystal display or instead of the liquid crystal display.

The SD I/F 208 is an interface of a secure digital (SD) memory card. The SD memory card can be used as a storage destination device of the past or previous setting information B1 and the output image data D2 subjected to the image processing at the operation panel 20. Further, a removable storage medium other than the SD memory card can be used.

Functional Configuration:

In the first embodiment, the main device 10 and the operation panel 20 operate independently each other using different operating systems, such as the main device 10 uses a specific OS dedicated to the multifunctional apparatus while the operation panel 20 uses the general-purpose OS. The application A2 of the operation panel 20 operates the main device 10 using the web API of the main device 10 under the control of the operating system of the operation panel 20.

The main device 10 performs various functions by reading and loading the programs stored in the ROM 101 and the HDD 103 onto the RAM 102 and sequentially executing the programs. Further, the operation panel 20 performs various functions by reading and loading the programs stored in the ROM 201 and the flash memory 203 onto the RAM 202 and sequentially executing the programs.

Figure 4:
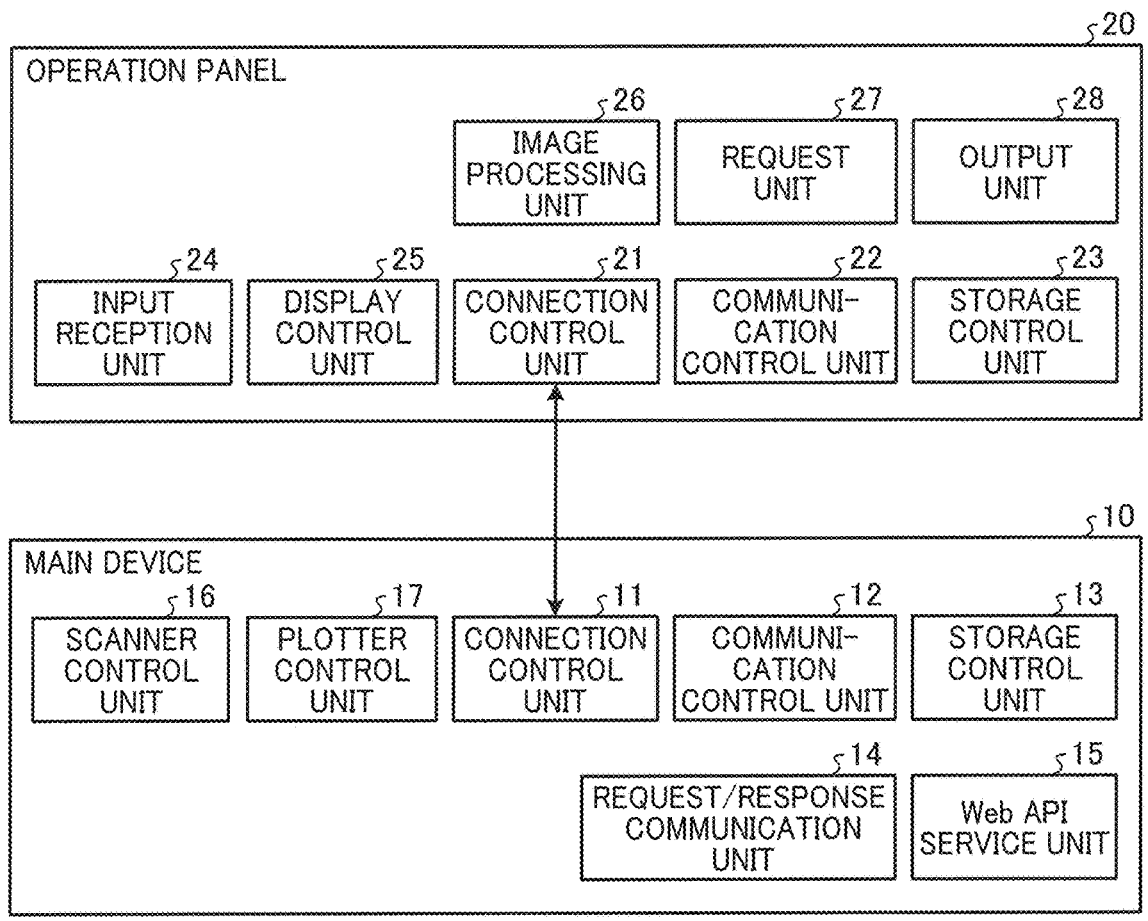
FIG. 4 illustrates an example of a functional block diagram of a main device and an operation panel.

FIG. 4 illustrates an example of a functional block diagram of the main device 10 and the operation panel 20. The operation panel 20 in FIG. 4 mainly illustrates functions related to the application A2.

As illustrated in FIG. 4, the main device 10 performs various functions, such as a connection control unit 11, a communication control unit 12, a storage control unit 13, a request/response communication unit 14, a web API service unit 15, a scanner control unit 16, and a plotter control unit 17.

The connection control unit 11 controls the connection I/F 105 to establish communication with the operation panel 20 to communicate data with the operation panel 20.

The communication control unit 12 controls the communication I/F 104 to establish communication with a designated communication destination to communicate data with the designated communication destination. The communication control unit 12 and the communication I/F 104 correspond to the network processing unit A8 (FIG. 1).

The storage control unit 13 manages a storage area of a memory (e.g., ROM 101, RAM 102, HDD 103), writes programs and data to the memory, and reads programs and data from the memory. The scanned image data D1 is stored in the image data storage unit A6 of the HDD 103. In this specification, the scanned image data D1 indicates, for example, JPEG image generated by the engine 106.

The request/response communication unit 14 performs hypertext transfer protocol (HTTP) communication with the operation panel 20. In this communication, the request/response communication unit 14 processes the request target data included in the received data. If an API is designated in the request target data, the request/response communication unit 14 acquires a processing result through the API of the web API service unit 15.

The web API service unit 15 provides various APIs. The request/response communication unit 14 and the web API service unit 15 are implemented as a web server included in the main device 10 of the MFP 1.

The scanner control unit 16 controls the scanner 10-1*b* via the engine 106*b* to acquire the scanned image data D1. The plotter control unit 17 controls the plotter A7 via the engine 106.

As illustrated in FIG. 4, the operation panel 20 performs various functions, such as a connection control unit 21, a communication control unit 22, a storage control unit 23, an input reception unit 24, a display control unit 25, an image processing unit 26, a request unit 27, and an output unit 28.

The connection control unit 21 controls the connection I/F 205 to establish communication with the main device 10 to communicate data with the main device 10. For example, the connection control unit 21 transmits a request and data to the connection control unit 11 of the main device 10 and receives data from the main device 10 as a response to the request.

The communication control unit 22 controls the communication IN 204 to establish communication with a communication destination to communicate data with the communication destination.

The storage control unit 23 manages a storage area of a memory (e.g., ROM 201, RAM 202, flash memory 203), writes programs and data to the memory, and reads programs and data from the memory. A part of the storage area of the RAM 202 is secured for the setting storage unit A4, and a work area for converting the scanned image data D1 (initial scanned image data).

The input reception unit 24 is a part of an "input unit." When the input reception unit 24 receives information of a touched position from the touch panel 206, the input reception unit 24 receives an input of an operation instruction.

The display control unit 25 causes the LCD 207 to display the screen information.

The image processing unit 26 receives settings of the setting information B1 via various screens to perform the image processing on the scanned image data D1 acquired from the main device 10 by applying the settings of the setting information B1. Specifically, the image processing unit 26 displays various screens on the LCD 207 using the display control unit 25, receives the settings input on various screens via the input reception unit 24, and instructs the storage control unit 23 to save or store the received settings in the setting storage unit A4 of the RAM 202 as the setting information B1. Further, the image processing unit 26 instructs the main device 10 to perform the scanning operation of document via the request unit 27, acquires the scanned image data D1 generated by performing the scanning operation from the main device 10, and then performs the image processing on the scanned image data D1 by applying the setting information B1.

The request unit 27 performs an HTTP communication with the request/response communication unit 14 of the main device 10. Specifically, the request unit 27 transfers a request corresponding to an input by a user received via a user interface (UI) to the web server of the main device 10 (including the request/response communication unit 14 and the web API service unit 15) using an HTTP client. In the HTTP communication, the request unit 27 selectively designates one or more APIs in the web API service unit 15, and then receives a processing result executed by the designated one or more APIs.

The output unit 28 outputs the output image data D2, generated by performing the image processing by the image processing unit 26, in accordance with the settings of the setting information B1. For example, if printing at the main device 10 is designated in the setting information B1, the printing of the output image data D2 is requested to the main device 10 via the request unit 27. Further, if a pre-set output destination on the network is designated in the setting information B1, the transmission of the output image data D2 to the designated output destination is requested to the main device 10 via the request unit 27. Further, if an SD memory card is designated in the setting information B1, the output image data D2 is output to the SD memory card attached to the operation panel 20. Further, if the operation panel 20 includes the network processing unit A8 (e.g., communication I/F 204) as above described, the transmission of the output image data D2 to a given output destination on the network can be performed using the network processing unit A8 of the operation panel 20 without using the network processing unit A8 of the main device 10. The details of an operation of the image processing system will be described in a second embodiment.

As to the functional configuration of the first embodiment, the image processing unit 26 displays various screens on the LCD 207 using the display control unit 25, and saves or stores the settings, received from various screens via the input reception unit 24, in the setting storage unit A4 of the RAM 202 as the setting information B1. That is, the image processing unit 26 includes a function of "setting unit." Further, the image processing unit 26 instructs the scanning operation of document to the main device 10 via the request unit 27, acquires the scanned image data D1 generated by performing the scanning from the main device 10, and performs the image processing on the scanned image data D1 based on the setting information B1. That is, the image processing unit 26 also includes a function of "processing unit." Other than the image processing unit 26, the output unit 28 can also include a function of "processing unit."

Figure 5:
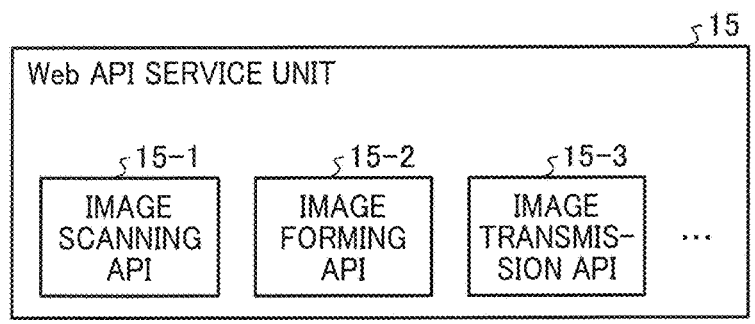
FIG. 5 illustrates an example of a plurality of application programming interfaces (APIs) corresponding to types of operations provided by a web API service unit.

FIG. 5 illustrates an example of a plurality of APIs corresponding to types of operations provided by the web API service unit 15. As illustrated in FIG. 5, the web API service unit 15 provides, for example, an image scanning API 15-1, an image forming API 15-2, and an image transmission API 15-3.

Screen Configuration of Operation Panel:

Hereinafter, a description is given of a screen configuration of an operation screen displayable on the operation panel 20 (LCD 207) using the application A2. The document image used in this description is assumed to be images of receipt sheets and business cards. Hereinafter, operation interfaces operated by a user, such as selection boxes, check boxes, and buttons indicate examples of the input key A3 (FIG. 1).

FIGS. 6 to 10 illustrate examples of configurations of setting screens used for setting the setting information B1.

Figure 6:
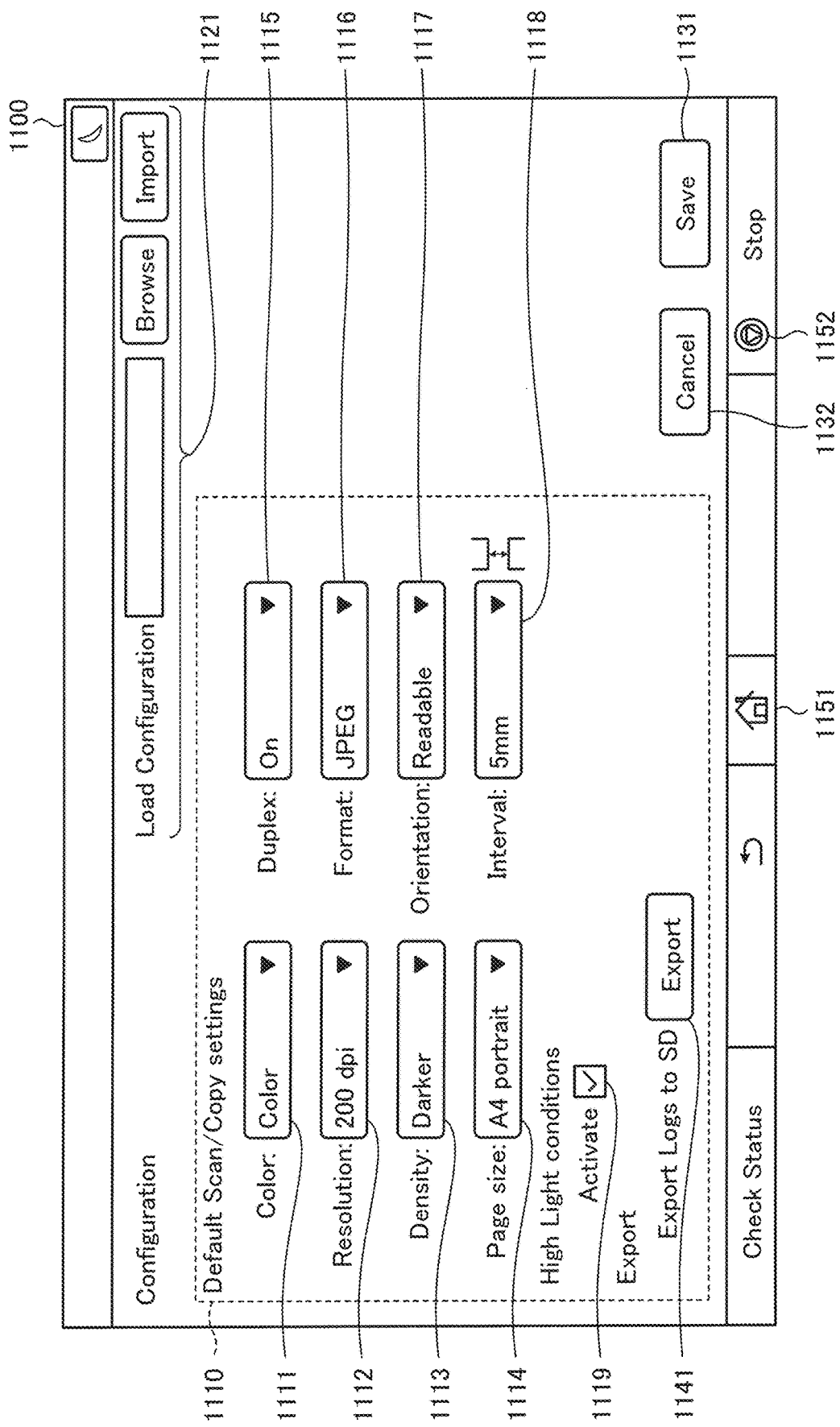
FIG. 6 illustrates an example of a setting screen for setting respective set values used for image processing.

FIG. 6 illustrates an example of a setting screen 1100 for setting respective set values used for the image processing. As illustrated in FIG. 6, the setting screen 1100 includes, for example, a plurality of selection boxes, such as a color selection box 1111, a resolution selection box 1112, a density selection box 1113, a page size selection box 1114, a duplex selection box 1115, a format selection box 1116, an orientation selection box 1117, an interval selection box 1118, and a filter check box 1119. Each of the selection boxes displays a selection list using a pull-down menu or the like. When a user selects a set value from the selection list, the selection box receives the selected set value from the selection list and displays the selected set value in the selection box. Further, the check box receives "ON" or "OFF" of each item displayed on the setting screen 1100, and switches "ON" and "OFF" of each item each time the user designates or selects "ON" or "OFF" of each item and displays a check mark when "ON" is selected.

The color selection box 1111 is a selection box for receiving settings of color, such as color, monochrome color, or the like. The resolution selection box 1112 is a selection box for receiving settings of resolution. The density selection box 1113 is a selection box for receiving settings of density such as dark, pale, or the like. The page size selection box 1114 is a selection box for receiving a set size such as "A4" and "B5." The duplex selection box 1115 is a selection box for receiving settings of the duplex printing.

The format selection box 1116 is a selection box for receiving settings of the image format, such as portable document format (PDF) and JPEG. The orientation selection box 1117 is a selection box for receiving settings of the rotation orientation or direction, such as a vertical direction and a horizontal direction. The interval selection box 1118 is a selection box for receiving settings of an arrangement interval of a plurality of document images.

The filter check box 1119 is a check box for receiving whether turning "ON" or "OFF" for settings of the image filter.

The setting screen 1100 also includes an input section 1121 for receiving an input of a destination for saving or storing previous or past settings, such as a storage medium (e.g., SD memory card) and a site on the Internet, from which the previous or past settings can be loaded. Specifically, when a user designates the saving destination and a file name storing the past settings in the input section 1121, the settings can be loaded from the designated SD memory card and/or the designated site on the Internet, and the loaded settings can be applied to each of the selection boxes and the check box in the setting screen 1100.

The setting screen 1100 further includes a save button 1131 and a cancel button 1132. The save button 1131 is used for receiving an instruction of saving the settings received on the setting screen 1100 as the setting information B1 in the setting storage unit A4 while the cancel button 1132 is used for receiving an instruction of restoring the information changed on the setting screen 1100 to the previous information, which is information before changing the information.

The setting screen 1100 further includes a log output button 1141. The log output button 1141 is used for receiving an instruction of outputting the settings received on the setting screen 1100 to a given storage medium (e.g., SD memory card). By pressing the log output button 1141, the settings received on the setting screen 1100 can be stored in the given storage medium (e.g., SD memory card) using the set file name.

The setting screen 1100 further includes a home button 1151 and a stop button 1152. The home button 1151 is used for returning to a home screen. The stop button 1152 is used for stopping all jobs. These buttons can be also provided on other screens to be described below and are assigned with the same reference numbers.

Figure 7:
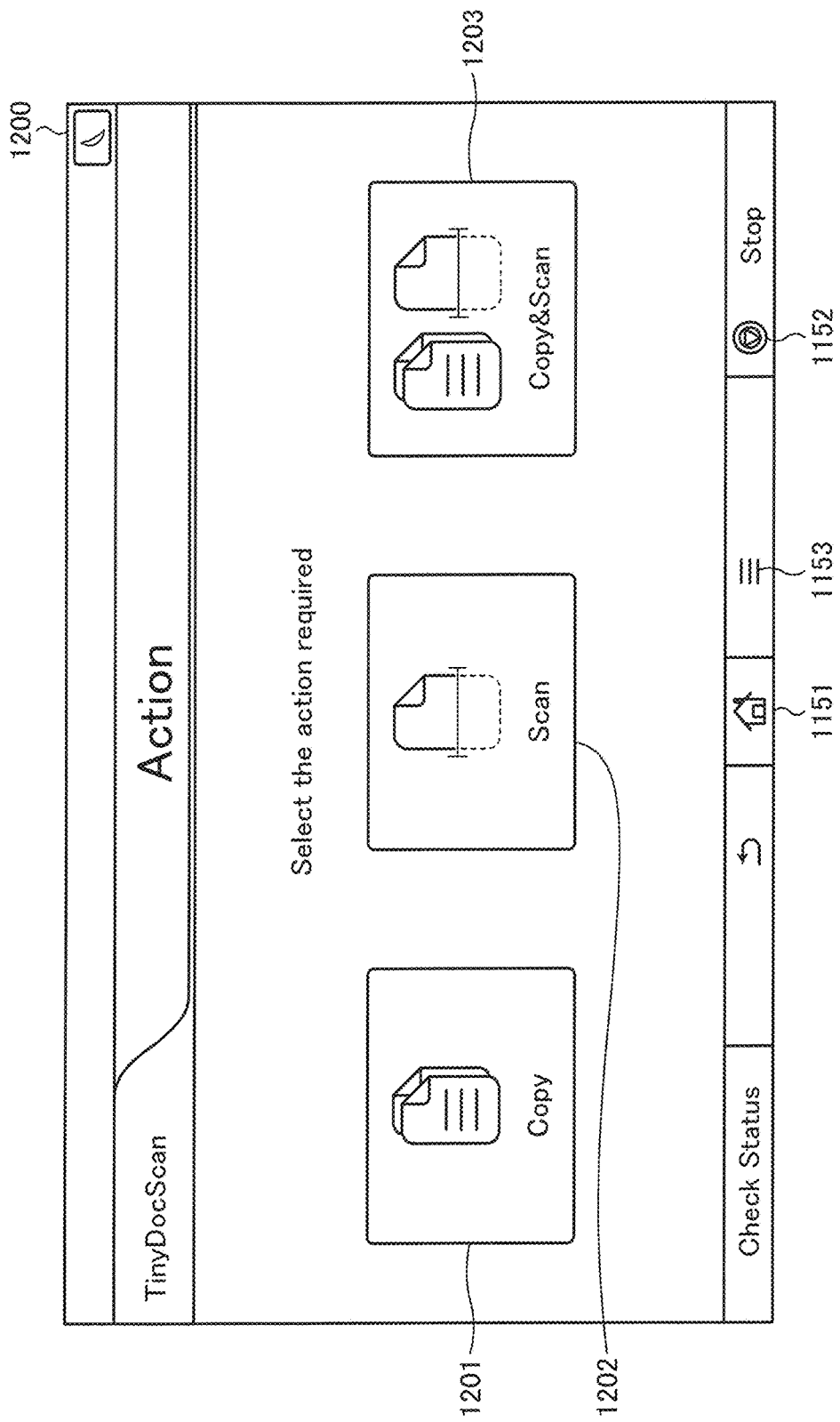
FIG. 7 illustrates an example of an action setting screen for setting processing to be executed by a main device.

FIG. 7 illustrates an example of a setting screen (hereinafter, action setting screen 1200) for setting processing (i.e., action) to be executed by the main device 10. As illustrated in FIG. 7, the action setting screen 1200 includes, for example, a copy button 1201, a scan button 1202, and a copy and scan button 1203 as examples of setting buttons of processes executable by the main device 10. In this example case, three types of buttons are set as the setting buttons, but the types and number of buttons can be changed depending on the functions of the main device 10.

The copy button 1201 is an input button for receiving settings to cause the main device 10 to perform the copying operation. In this example case, "copy" uses the scanner function and the printing function of the main device 10. Specifically, when the copy button 1201 is pressed, the scanner 10-1b scans an image of document to generate the scanned image data D1, the scanned image data D1 receives the image processing in the operation panel 20 to generate the output image data D2, and then the output image data D2 is output using the plotter A7.

The scan button 1202 is an input button for receiving settings to cause the main device 10 to perform the scanning operation. Specifically, when the scan button 1202 is pressed, the scanner 10-1b scans an image of document to generate the scanned image data D1, the scanned image data D1 receives the image processing in the operation panel 20 to generate the output image data D2, and then the output image data D2 is output or and transmitted to a storage medium, such as an SD memory card and another apparatus disposed on the network.

The copy and scan button 1203 is an input button for receiving settings to cause the main device 10 to perform both the copying operation and scanning operation.

Further, the action setting screen 1200 includes a switching button 1153 for calling the setting screen 1100. By pressing the switching button 1153, the setting screen 1100 is displayed.

Figure 8:
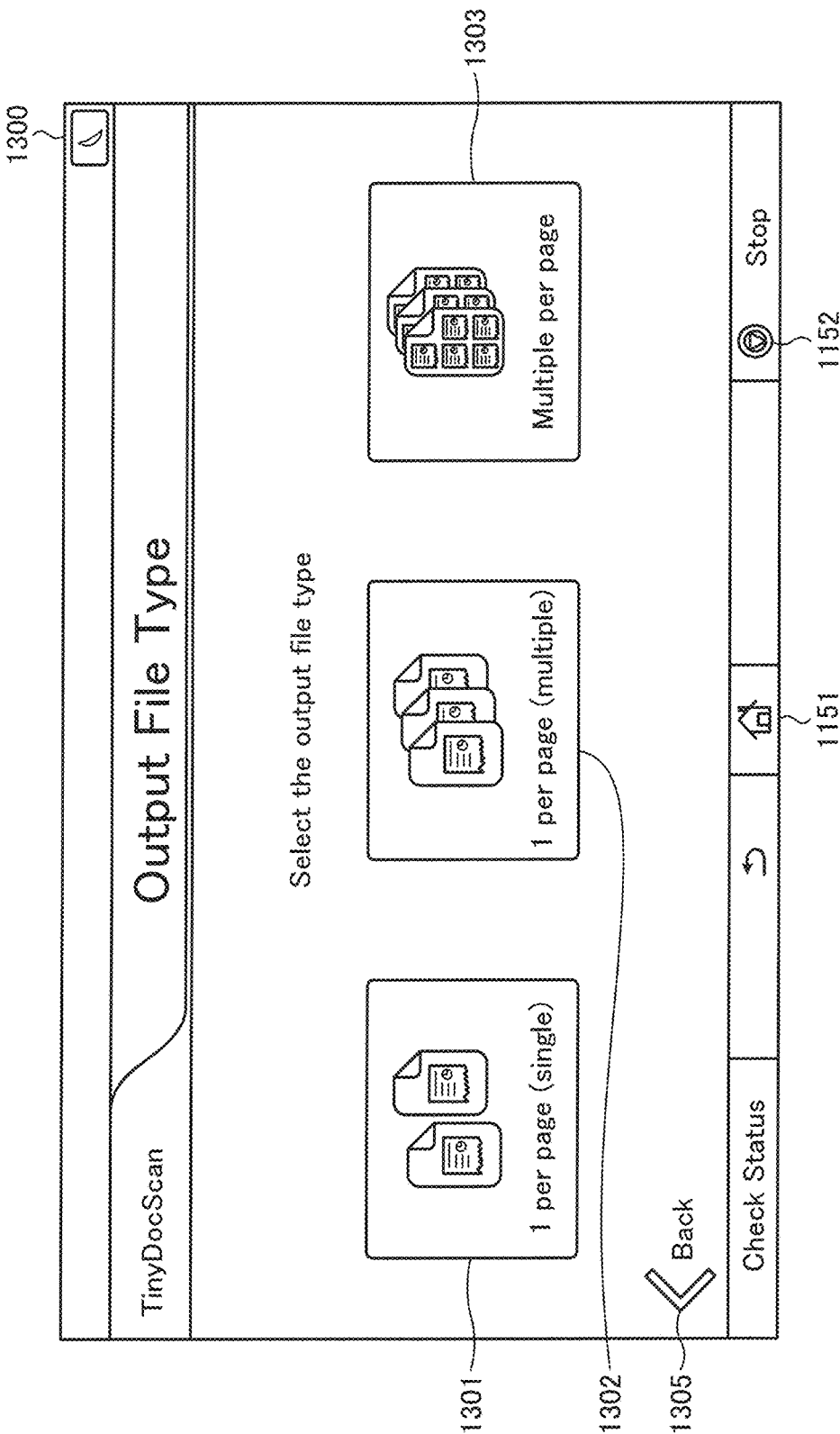
FIG. 8 illustrates an example of a file type setting screen for setting a file type to be output.

FIG. 8 illustrates an example of a setting screen (hereinafter, file type setting screen 1300) for setting a file type to be output. The file type setting screen 1300 includes, for example, a single page button 1301, a multiple page button 1302, and a signal page multiple button 1303 as examples of types of file of the output image data D2. In this example case, three types of buttons are set as the file type setting buttons, but the types and number of buttons can be changed depending on the design.

The single page button 1301 is an input button for receiving settings to generate a single file. The "single file" indicates an image file including one document image.

The multiple page button 1302 is an input button for receiving settings for generating multiple pages. The "multiple pages" indicate that a plurality of single files are aggregated as one file.

The single page multiple button 1303 is an input button for receiving settings that generate one single page including multiple images. The "single page multiple" indicates an image file aggregating a plurality of document images on each page.

The file type setting screen 1300 further includes a return button 1305. The return button 1305 is a button for receiving an instruction of returning to a previous screen. The return button 1305 is also provided on other screens with the same reference number.

Figure 9:
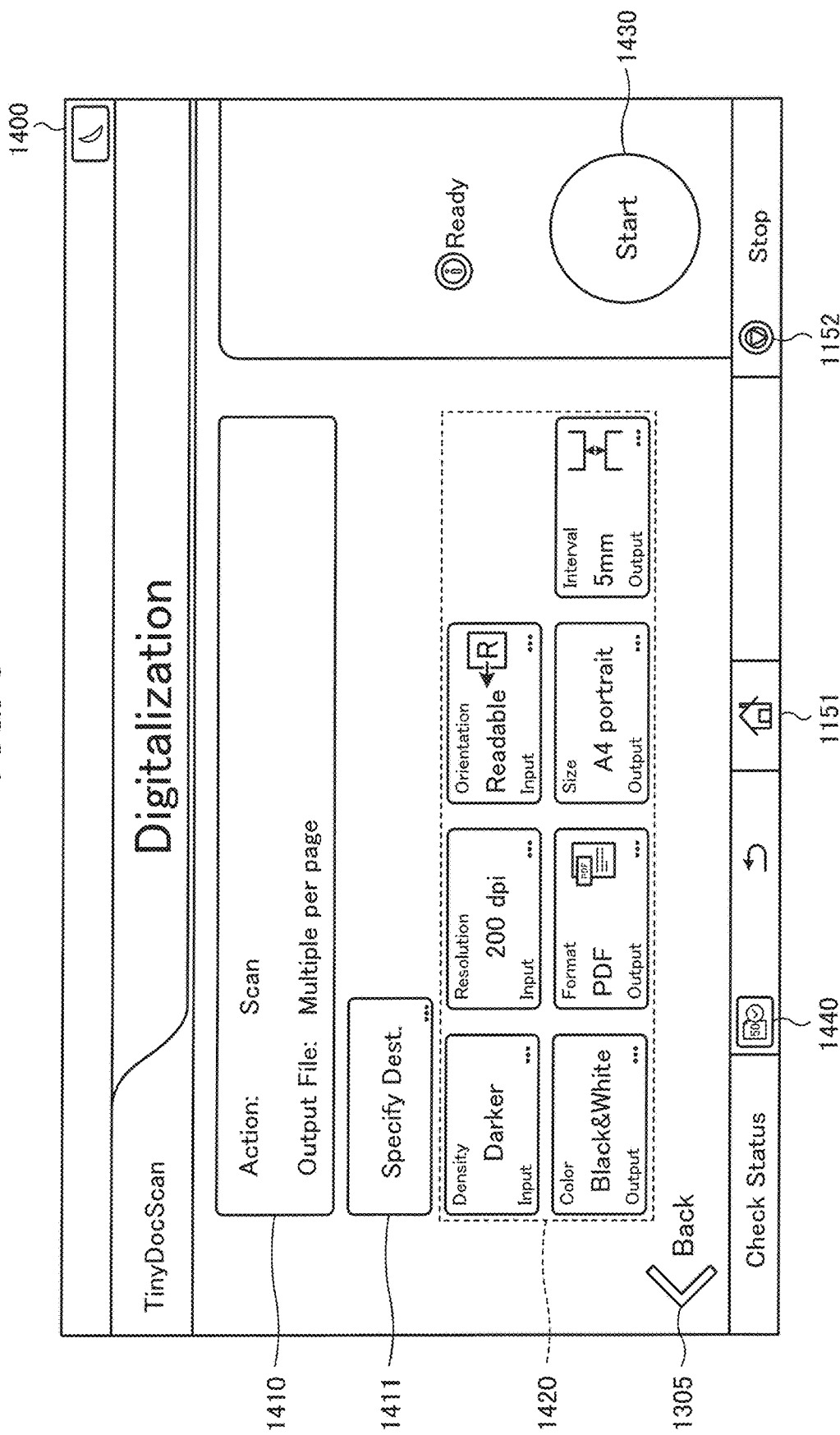
FIG. 9 illustrates an example of a setting confirmation screen used for confirming settings.

FIG. 9 illustrates an example of a setting confirmation screen 1400 used for confirming or checking the settings. A user can check or confirm the settings of the setting information B1 stored in the setting storage unit A4 by viewing the setting confirmation screen 1400, and if there is no need to change the settings, the user instructs to start an action.

The setting confirmation screen 1400 includes an first area 1410 and a second area 1420 as confirmation areas of the setting information B1. The first area 1410 is an area for displaying the settings selected on the action setting screen 1200 and the file type setting screen 1300. The second area 1420 is an area for displaying the respective set values set on the setting screen 1100. Further, each of the respective set values can be changed on the second area 1420.

The setting confirmation screen 1400 further includes a transmission destination setting button 1411. When the scan or the copy/scan is selected on the action setting screen 1200, a transmission destination to which the output image data D2 is to be transmitted is specified. When the transmission destination setting button 1411 is pressed, a transmission destination setting screen 1500 (FIG. 10) including a Secure Shell File Transfer Protocol (SFTP) button is displayed, and the transmission destination is selected on the transmission destination setting screen 1500.

The setting confirmation screen 1400 further includes a start button 1430 in an area on the right side of the setting confirmation screen 1400. The start button 1430 is a button for receiving an instruction of starting processing of various actions when the user presses the start button 1430.

The setting confirmation screen 1400 further includes an icon 1440 indicating a medium connected to the operation panel 20.

Figure 10:
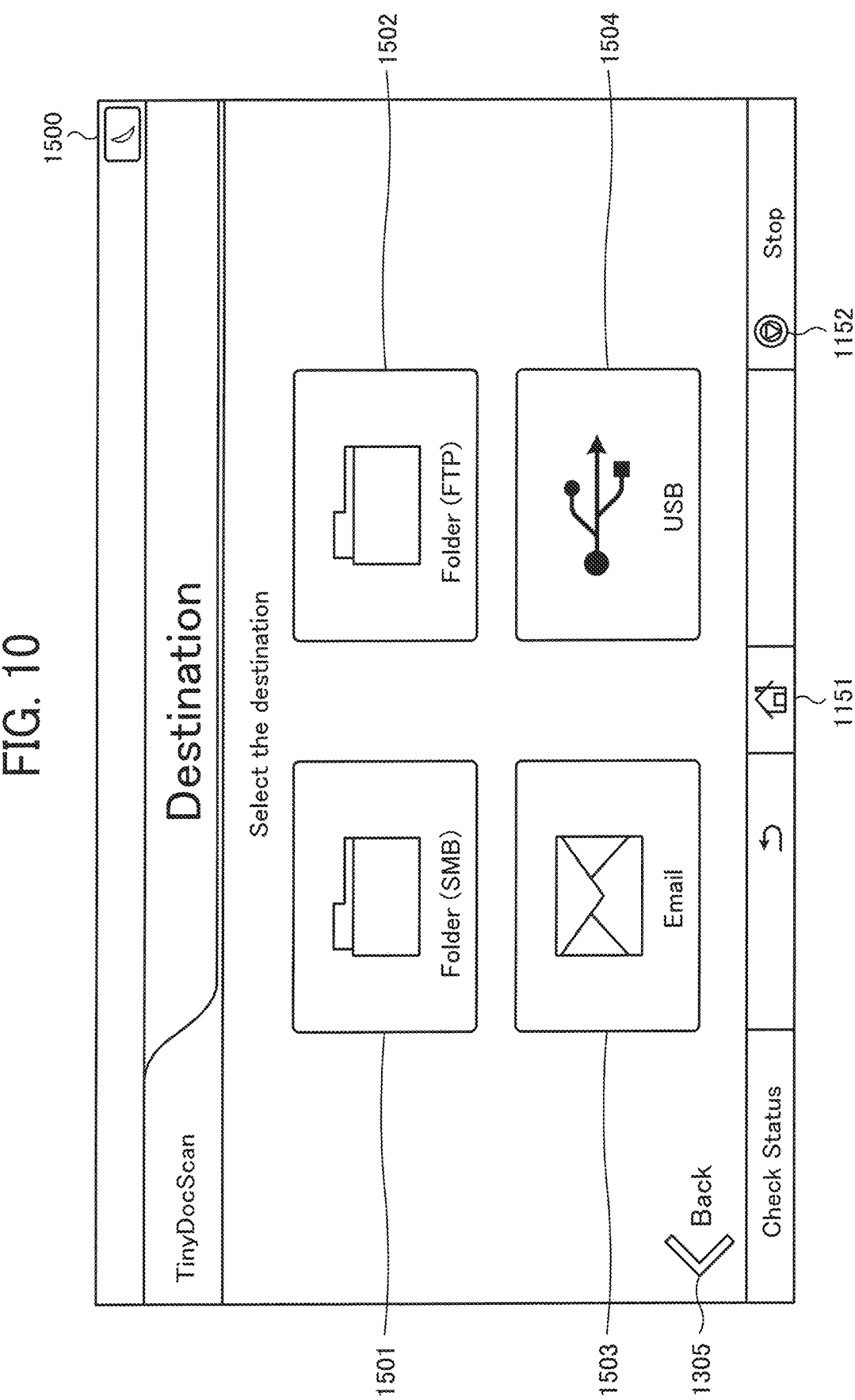
FIG. 10 illustrates an example of a transmission destination setting screen for setting a transmission destination of output image data.

FIG. 10 illustrates an example of a screen for setting a transmission destination of the output image data D2 (hereinafter, transmission destination setting screen 1500). The transmission destination setting screen 1500 includes, for example, a server message block (SMB) button 1501, a file transfer protocol (FTP) button 1502, an email button 1503, and a USB button 1504 as buttons for setting the transmission destination. In this example case, four types of buttons are set as the transmission destination setting buttons, but the types and number of buttons can be changed depending on the design.

The SMB button 1501 is a button for receiving a setting for designating an SMB folder as the transmission destination. The FTP button 1502 is a button for receiving a setting for designating an FTP folder as the transmission destination. The email button 1503 is a button for receiving a setting for designating an email address as the transmission destination. The USB button 1504 is an input button for receiving a setting for designating a USB memory as the transmission destination.

Figure 11:
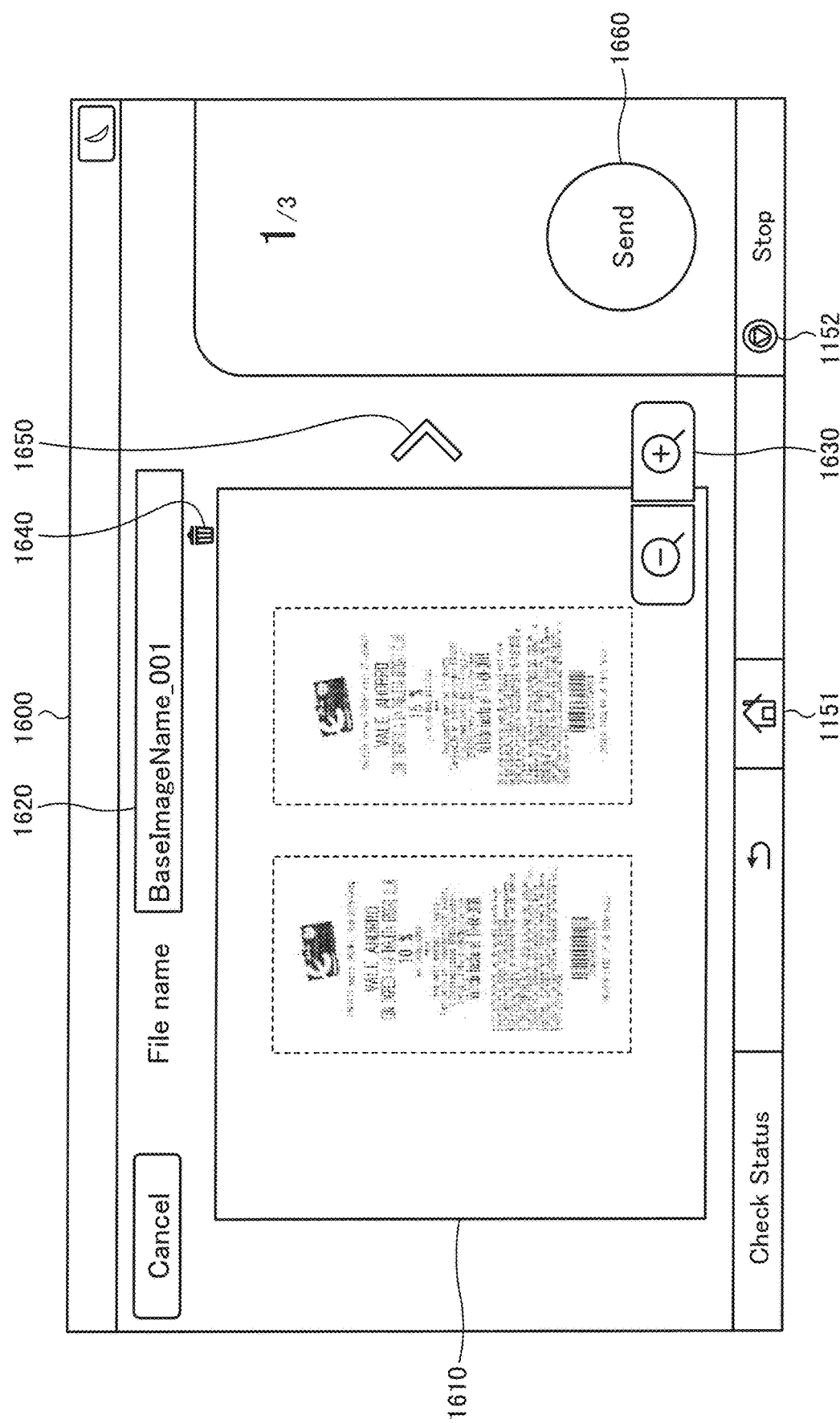
FIG. 11 illustrates an example of a preview screen, in which an image having received image processing and before outputting is previewed.

FIG. 11 illustrates an example of a preview screen 600, in which an image having received the image processing and before outputting is previewed. The preview screen 1600 is a screen that is displayed after performing the processing based on the settings, which is started by pressing the start button 1430 on the setting confirmation screen 1400 (FIG. 9).

The preview screen 1600 includes, for example, an image display area 1610 for displaying an image before outputting. The preview screen 1600 further includes, for example, a file name box 1620 for displaying a file name of the image before outputting. In an example case of FIG. 11, an image having a file name of "BaseImageName_001" including image data of two receipt sheets is displayed as an example of the image before outputting. The image, displayed in the image display area 1610, can be generated by extracting the images of two receipt image regions from the scanned image data D1 by performing the image processing to be described later and synthesizing the extracted images. In FIG. 11, for the purpose of description, each of the receipt image regions (first region) in the image is indicated by a dashed line. Further, the file name can be automatically assigned with a unique number, or a user can set an arbitrary value for the file name. Further, an enlargement/reduction operation button 1630 for enlarging and reducing the image is provided near the image display area 1610. In response to an operation of the enlargement or reduction buttons of the enlargement/reduction operation button 1630, the image before outputting can be enlarged or reduced in the image display area 1610.

The preview screen 1600 further includes a delete button 1640 near the image display area 1610. The delete button 1640 is a button for receiving an instruction of deleting the image displayed on the image display area 1610. The delete button 1640 can receive an instruction of deleting data of image being displayed in the image display area 1610, or the delete button 1640 can receive an instruction of designating a part of an image by a user touch operation on the image display area 1610 to replace the part of the image designated by the user with a given color (e.g., background color). If the former case is applied for the example case of FIG. 11, the image data of one page having two receipt images, which are displayed on the image display area 1610, are erased. If the latter case is applied for the example case of FIG. 11, the image data of one of the two receipt images designated by the user and/or the image data of a region other than the receipt images (second region) that is affected by the external light is replaced with a designated color.

The preview screen 1600 further includes a next button 1650 near the image display area 1610. The next button 1650 is used as a button for receiving an instruction of switching the image displayed on the image display area 1610 from one image to a next image among the images before outputting.

The preview screen 1600 further includes an output button 1660 (send button) in an area on the right side of the preview screen 1600. The output button 1660 is a button for receiving an output instruction to the output destination set in the setting information B1 when the user presses the output button 1660.

Operation of MFP:

Hereinafter, a description is given of an operation of the MFP 1. At first, the processing executed by the operation panel 20 is described, and then the processing of the MFP 1 including the main device 10 is described. The various screens of FIGS. 6 to 11 may be referred to as appropriate in the description of the processing.

Figure 12B:
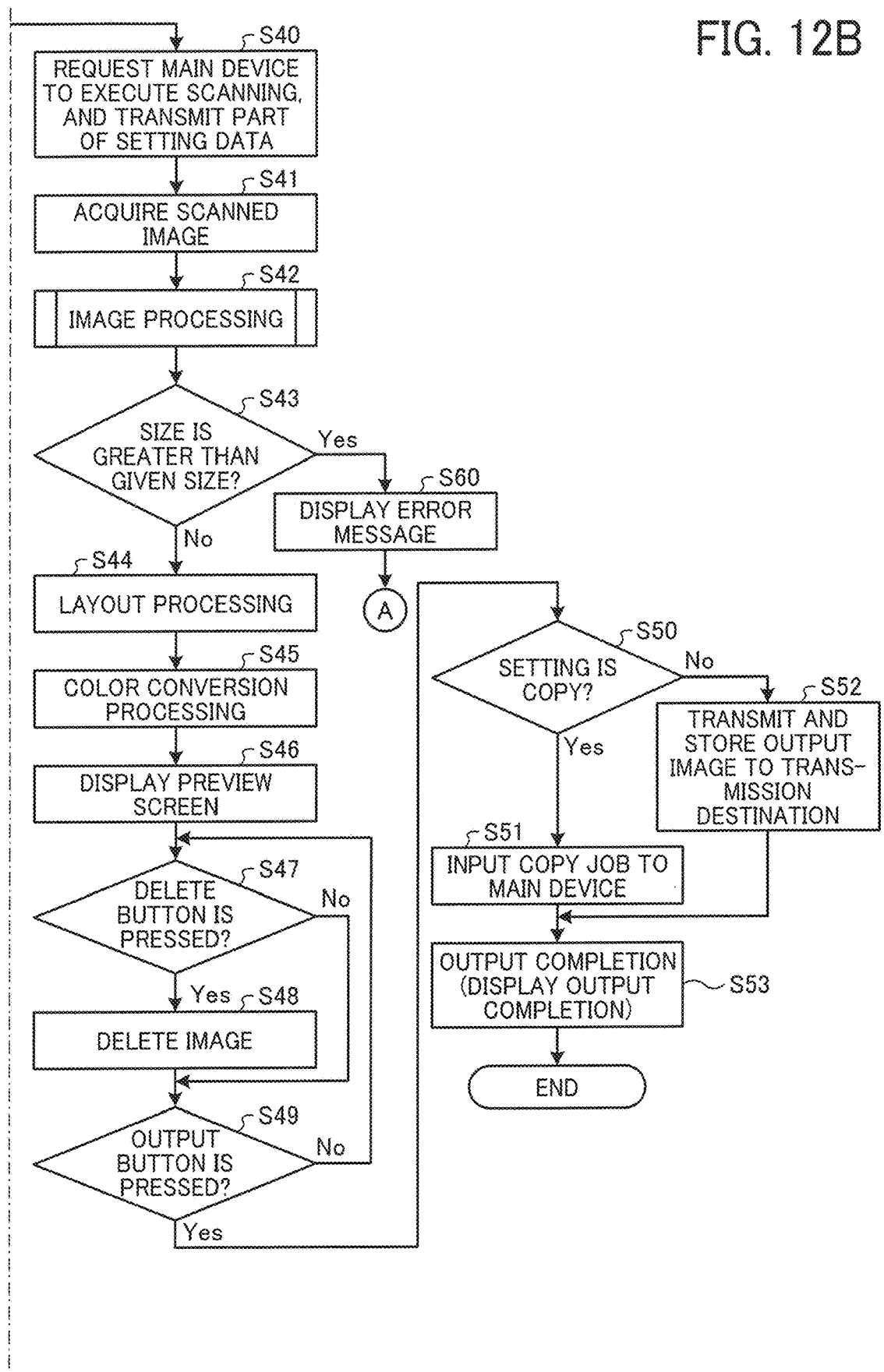

Processing at Operation Panel:

FIG. 12 (12A and 12B) is an example of a flow chart illustrating the steps of processing at the operation panel 20. FIG. 12 illustrates an example of the flow chart of processing of the application A2 of the operation panel 20 after a system of the MFP 1 is activated and then the general-purpose OS of the operation panel 20 is activated.

At first, the application A2 displays the setting screen 1100 (FIG. 6) at the activation timing of the first-time use (S11) and then receives various operations input by a user on the setting screen 1100 (S12). During this input operation, the application A2 updates a display of the setting screen 1100 appropriately in accordance with the contents of the input operation.

For example, if an operation of reading the past or previous setting information is performed, the application A2 displays the read settings as the settings selected and designated for each of the selection boxes. Further, if each selection box is operated, an item list is displayed in the operated selection box using a pull-down menu or the like, and if one item is selected from the item list and received, the one item is displayed as a set value selected and designated for the operated selection box.

After receiving the setting operation (S12), the application A2 receives the pressing of the save button 1131 or the cancel button 1132 on the setting screen 1100 (FIG. 6) and performs a process corresponding to the pressed button (S13). If the save button 1131 is pressed, the application A2 saves or stores the settings set on the setting screen 1100 in the setting storage unit A4. On the other hand, if the cancel button 1132 is pressed, the application A2 discards the settings input by the user on the setting screen 1100.

The process of displaying the setting screen 1100 at the activation timing and setting the setting information is performed only at the activation timing of the first-time use, and from the activation timing of the second-time use, the application A2 can skip steps S11 to S13 but starts the sequence from step S14. Therefore, from the second-time use, the setting information set at the activation timing of the first-time use can be used as the setting information B1.

Then, the application A2 displays the action setting screen 1200 (S14).

Then, the application A2 receives an input operation for the function of the main device 10, to be used by the user, on the action setting screen 1200 (S15). For example, the application A2 receives an input operation (e.g., selection input) related to specific processing to be executed by the main device 10. For example, if the user presses one of the selection buttons (e.g., scan button 1202) related to specific processing to be executed by the main device 10 on the action setting screen 1200, the application A2 receives the specific processing as the setting of the processing to be executed by the main device 10. The received setting is then written in the setting information B1 stored in the setting storage unit A4. Further, if the switching button 1153 is pressed on the action setting screen 1200 (FIG. 7), the application A2 displays the setting screen 1100 (FIG. 6), and then the application A2 can receive the settings of another setting information via the setting screen 1100.

If one of the selection buttons is pressed on the action setting screen 1200 (FIG. 7), the application A2 displays the file type setting screen 1300 (FIG. 8) (S16) and receives an input operation (e.g., selection input) for a file type via the file type setting screen 1300 (S17). For example, if one of the selection buttons of the file type (e.g., single page button 1301) is pressed by the user on the file type setting screen 1300, the application A2 receives a specific file type designated by the pressed button as the setting of the file type to be applied to the scanned image data D1. In this case, it is assumed that the received setting is written in the setting information B1 stored in the setting storage unit A4.

Then, the application A2 displays the setting confirmation screen 1400 (FIG. 9) and receives an input of various buttons on the setting confirmation screen 1400 (S18).

Then, if the start button 1430 is pressed on the setting confirmation screen 1400 (S19: YES), the application A2 performs the sequence from step S40. The sequence from step S40 will be described later.

If the transmission destination setting button 1411 is pressed (S19: NO, S20: YES), the application A2 displays the transmission destination setting screen 1500 (FIG. 10) (S21) and then receives an input operation of a transmission destination (e.g., selection input) via the transmission destination setting screen 1500 (S22). For example, if one of the transmission destination selection buttons (e.g., email button 1503) is pressed by the user on the transmission destination setting screen 1500, the application A2 receives a specific transmission destination designated by the pressed button as the setting of the transmission destination of the output image data D2. After receiving the transmission destination, the sequence returns to step S18.

Further, if any one of the displayed buttons (i.e., setting change buttons) having respective setting values displayed in the second area 1420 is pressed on the setting confirmation screen 1400 (S19: NO, S20: NO, S30: YES), the application A2 receives a change of a set value of the pressed button and sets the changed set value (S31). After the setting, the sequence returns to step S19.

If the application A2 does not receive the pressing of the setting change button on the setting confirmation screen 1400 (S19: NO, S20: NO, S30: NO), the application A2 repeats the sequence from step S19. Further, although the processing is not illustrated in detail, if the return button 1305 on the setting confirmation screen 1400 (FIG. 9) is pressed, the application A2 displays the file type setting screen 1300 (FIG. 8) used at the most-recent time, and if the return button 1305 on the file type setting screen 1300 (FIG.

8) is further pressed, the application A2 displays the action setting screen 1200 (FIG. 7). When the return button 1305 is pressed in this way, the application A2 performs the above described sequence from the screen that is returned.

Hereinafter, a description is given of the sequence from step S40 when the start button 1430 is pressed on the setting confirmation screen 1400 (FIG. 9).

If the start button 1430 on the setting confirmation screen 1400 is pressed by the user and the application A2 receives an instruction of executing specific processing, such as the scanning, the application A2 requests the main device 10 to execute the scanning (S40). The application A2 transmits the request with set values used for the scanning, such as color, resolution, density, page size, image format, or the like to the main device 10, in which application A2 always transmits JPEG settings with color. With this configuration, the main device 10 can constantly generate images using the same settings.

After requesting the execution of scanning to the main device 10 (S40), the application A2 acquires the scanned image data D1, generated by scanning a document using the main device 10, from the image data storage unit A6 of the main device 10, and loads the scanned image data D1 on the work area of the RAM 202 (S41).

Then, the application A2 performs the image processing on the scanned image data D1 in the work area of the RAM 202 in accordance with the settings of the setting information B1 used for performing post-processing (S42). At first, the application A2 performs the image processing. The image processing includes, for example, extracting the receipt image region (first region) and correcting the inclination of the extracted receipt image. The details of the image processing will be described later with reference to FIG. 13.

After performing the image processing (S42), the application A2 performs the pre-output processing, such as "size check," "layout processing," and "color conversion processing." In the size check, the application A2 determines whether the image data after the image processing is greater than a given image size (S43). Specifically, the application A2 determines whether the size of the extracted receipt image fits within the image size to be output for each receipt image.

If the image data after performing the image processing is greater than the given image size (S43: YES), the application A2 displays an error message (S60) and returns the sequence to step S18. In this case, for example, the user separates the documents and places the documents on the contact face of the contact glass 10-1c and then restarts the operation from the setting confirmation screen 1400 (FIG. 9).

If the image data after performing the image processing is not greater than the given image size (S43: NO), the application A2 performs the layout processing (S44), the color conversion processing (S45), and then displays the processed image on the preview screen 1600 (S46).

The layout processing is performed based on the setting of the file type of the output image data D2 in the setting information B1. The application A2 performs the layout processing by comparing a sum of dimensions, such as a sum of the width of each image of each receipt image region (first region) and the interval between the receipt images (i.e., a set value of the image arrangement interval), and a given set size to arrange each image in the image file.

For example, when the "single page multiple" is set, the application A2 rotates each image in the receipt image region (first region) acquired by the image processing in accordance with the settings of the vertical and horizontal rotation set in the setting information B1 and then arranges the rotated images in a given order in accordance with the settings of the image arrangement interval to fit the receipt images within one image file. If the images do not fit within the one image file, the application A2 sets the image of the remaining receipt image region into another one image file. If the image does not further fit within another one image file, the application A2 sets the image of the remaining receipt image region into still another one image file. The application A2 repeats the layout processing until all the images in the receipt image regions are arranged.

Further, the color conversion processing converts the current color using a color set in the setting information B1. In this example case, since the color image is always acquired from the main device 10, if monochrome is set in the setting information B1, the application A2 converts the color image into a monochrome image.

With this configuration, the image having received the layout processing and the color conversion processing (the image before outputting) is displayed on the preview screen 1600.

Then, if the application A2 receives the pressing of the delete button 1640 on the preview screen 1600 (S47: YES), the application A2 deletes a deletion target image displayed in the image display area 1610 among a plurality of images arranged by performing the layout processing (S48). The deletion target image includes, for example, a receipt image including glare of a fluorescent lamp or the like in the scanned image data D1 and thereby cut out incorrectly. Such a phenomenon occurs when the filter processing, to be described later, is not performed for the image processing. When the user presses the next button 1650 on the preview screen 1600 to switch the image displayed on the image display area 1610 one by one, the deletion target image can be displayed on the image display area 1610. Then, the deletion target image can be deleted by pressing the delete button 1640. If the deletion target image is displayed, the deletion target image alone can be deleted by pressing the delete button 1640. Further, if the application A2 receives the deletion of all of images in response to the pressing of the deletion button 1640, an error message may be displayed, and then the sequence returns to step S18.

If the application A2 does not receive the pressing of the delete button 1640 (S47: NO), the application A2 determines whether the output button 1660 is pressed (S49). If the output button 1660 is not pressed (S49: NO), the sequence returns to step S47.

If the output button 1660 is pressed (S49: YES) while there is still one or more images (image file) that have not been deleted, the application A2 converts an image format of a series of images (image file) into an image format, such as portable document format (PDF) (registered trademark), based on the settings of the set information B1, and performs the output processing.

In the output processing in FIG. 12, if the setting of action process is "copy" (S50: YES), the application A2 requests the printing to the main device 10 to utilize the image forming function (printing function) of the main device 10 (S51). In step S51, the application A2 outputs a copy job to the main device 10 and transmits the output image data D2 having received the processing at the operation panel 20.

If the setting of the action process is the scanning (S50: NO), the application A2 transmits the output image data D2 to a transmission destination designated on the transmission destination setting screen 1500 (S52). If the setting of the action process is "copy and scan," the application A2 performs both steps S51 and S52.

After the completion of the above described processing, the application A2 displays completion information indicating the output is completed (S53) and then ends the sequence by storing the setting information B1 in the setting storage unit A4 or clearing the setting information B1 from the setting storage unit A4. After the completion of this sequence, the MFP1 displays the initial screen or the like and waits until the user inputs an instruction or the like.

Figure 13:
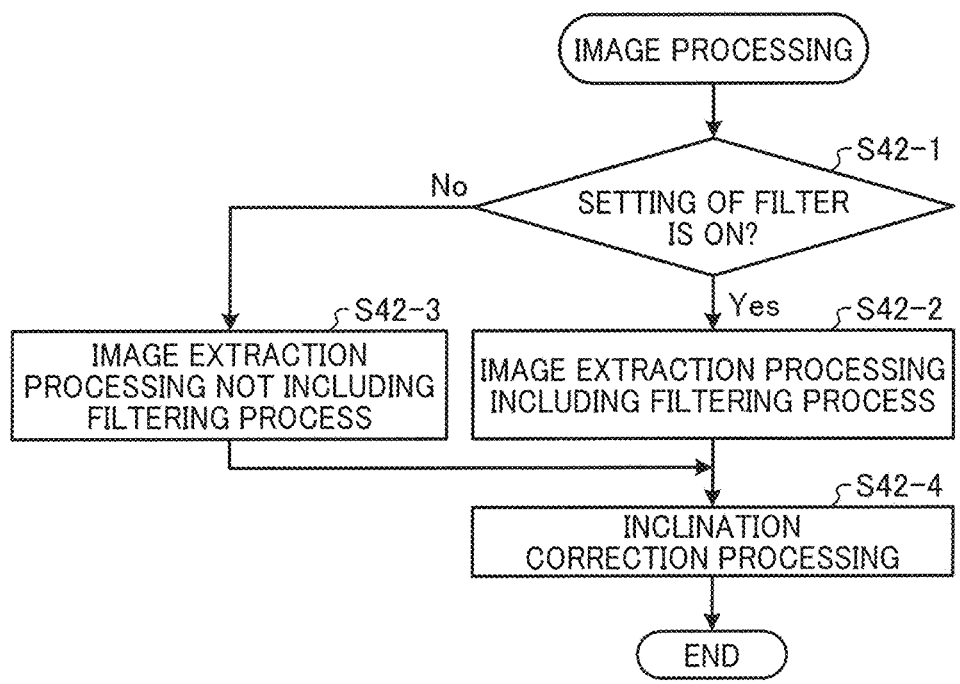
FIG. 13 is an example of a flow chart illustrating the steps of image processing in FIG. 12.

FIG. 13 is an example of a flow chart illustrating the steps of the image processing in step S42 of FIG. 12. The application A2 performs the image processing on the scanned image data D1 stored in the image data storage unit A6 in accordance with the setting information B1 stored in the setting storage unit A4.

Specifically, the application A2 determines whether the setting of the filter of the setting information B1 is turned ON (S42-1) and performs the image processing suitable for the surrounding environment of the scanning in accordance with the setting of the filter in the setting information B1.

For example, if the setting of the filter is turned ON (S42-1: YES), the application A2 performs the image extraction processing including the filtering process on the scanned image data D1 stored in the image data storage unit A6 (S42-2). The image extraction processing including the filtering process corresponds to a procedure of the image processing illustrated in FIG. 14B, in which information of light such as fluorescent light causing the glare in the scanned image data D1 is removed by performing the filtering process, the boundary of document image is highlighted, and then the document image is cut off appropriately.

On the other hand, if the setting of the filter is turned OFF (S42: NO), the application A2 performs the image extraction processing not including the filtering process (S42-3). The image extraction processing not including the filtering process corresponds to a procedure of the image processing illustrated in FIG. 14A, in which the document image is cut off appropriately by performing a simpler procedure because the glare of light such as a fluorescent lamp is not included.

After cutting out the document image appropriately, the application A2 performs an inclination correction processing to correct an inclination of the cut-out document image (S42-4). The inclination correction processing corrects the inclination of the image that occurs when the scanning of the document image is performed while the document image is being inclined on the contact face of the contact glass 10-1c. Since documents such as receipt sheets and business cards are light weight, the receipt sheets and business cards may move and incline on the contact glass 10-1c if the receipt sheets and business cards are not pressed from the rear of the receipt sheets and business cards. When a plurality of the receipt sheets and business cards are arranged on the contact glass 10-1c, the receipt sheets and business cards may incline in different directions. Even if the documents such as receipt sheets and business cards are inclined, the inclination can be corrected for each document sheet by performing the inclination correction processing.

Image Processing at Operation Panel:

Hereinafter, a description is given of the image processing performed on the scanned image data D1, acquired from the main device 10, at the operation panel 20. In this example case, it is assumed that documents such as a plurality of receipt sheets is arranged on the contact face of the contact glass 10-1c of the scanner unit 10-1 and scanned, and then the image processing of the scanned image data D1 including document images of the plurality of receipt sheets is performed.

Typically, the receipt sheet is prepared as a rolled white paper. After black colored information is printed on the rolled white paper, the paper is cut off at a position corresponding to the end of printed information while setting a margin at the end of the printed information to create the receipt sheet. The receipt sheet has a printing area surrounded by four sides having a white margin of sufficient width, and thereby the printing information is printed on the printing area surrounded by the white margins. When the document having the white margins is scanned, the following method can be used.

In the method, the plurality of receipt sheets is scanned while closing the ADF 10-1a on the contact face of the contact glass 10-1c. Typically, a user arranges the document sheets such as the plurality of receipt sheets on the contact face of the contact glass 10-1c and then closes the ADF 10-1a on the contact glass 10-1c. Then, the plurality of receipt sheets sandwiched between the contact glass 10-1c and the ADF 10-1a. is scanned in a closed condition. In this case, the edge of document sheet (e.g., receipt sheet) is white and the rear cover of the ADF 10-1a is also typically white. Therefore, the light reflected at the edge of receipt sheet and the light reflected by the rear cover are detected as the same white light, in which it is difficult to detect the boundary (edge) of the receipt image region (first region) in the scanned image data D1 generated by performing the scanning.

Therefore, the scanning may be performed while opening the ADF 10-1a. That is, the plurality of receipt sheets is scanned in an opened condition without being sandwiched between the contact glass 10-1c and the ADF 10-1a. In this case, since there is no rear cover at the back of the receipt sheet, the scan light does not reflect from the rear cover, and thereby the background image of the receipt sheet becomes darker.

If the ADF 10-1a is used in the opened condition under a certain installation environment of the MFP 1, the glare of light such as a ceiling lamp (fluorescent light) may occur in the scanned image data D1. In this case, the receipt image may not be accurately cut out (extracted) from the scanned image data D1. However, this issue can be solved by including the filtering process in the image processing in the first embodiment.

FIGS. 14A and 14B illustrate examples of procedures of the image processing when the filtering process is turned OFF and when the filtering process is turned ON. In an environment where there is no glare of external light (e.g., fluorescent lamp), the filter processing is turned OFF, and in an environment where the glare of external light (e.g., fluorescent lamp) occurs, the filter processing is turned ON. In both cases, a boundary between the receipt image region corresponding to the receipt region (first region) and another image region (second region) other than the receipt image region is detected to extract the receipt image in the first embodiment. The ON/OFF setting of the filtering process can be performed appropriately on the setting screen 1100. For example, a user can set ON/OFF setting of the filtering process when the scanning is performed each time, or a service person or the like can set ON/OFF setting of the filtering process as the initial setting when the MFP 1 is installed.

FIG. 14A illustrates an example case of the image processing when the setting of the filter processing is turned OFF. At first, the operation panel 20 receives the scanned image data D1 from the main device 10 at stage 1. The scanned image data D1 at stage 1 is an image corresponding to a status that three receipt sheets are arranged on the contact face of the contact glass 10-1c and scanned. Since the environment does not cause the glare of light (e.g., fluorescent light), the background of the receipt becomes dark. Although the scanned image data D1 is a monochrome image in FIG. 14A, the scanned image data D1 is an RGB color image in this example case.

Then, the application A2 performs binarization processing and boundary extraction processing on the scanned image data D1 to generate image information of stage 2. In the binarization processing, the application A2 binarizes the scanned image data D1. Specifically, the application A2 generates pixels having luminance values darker than a reference luminance value as black pixels and generates pixels having luminance values brighter than the reference luminance value as white pixels. Then, the application A2 performs the boundary extraction processing on the binarized image. In this example case, since the four sides of each of the three receipt sheets are white and the background is black, the boundary can be accurately extracted at the edge of each receipt image region (first region) at stage 2 by extracting the boundary of white and black.

After extracting the boundary (boundary line) of each receipt, the application A2 cuts out the three receipt image regions from the scanned image data D1 at the position of the respective boundary lines at stage 3. After cutting out the three receipt image regions from the scanned image data D1, each image of the three receipt sheets of stage 3 can be obtained. Then, the application A2 assigns a respective identification code for each image and then performs the layout processing for arranging each image in an image file in accordance with the settings.

FIG. 14B illustrates an example case of the image processing when the setting of the filtering process is turned ON. At first, the operation panel 20 receives the scanned image data D1 from the main device 10 at stage 1. As similar to FIG. 14A, the three receipt sheets are arranged on the contact face of the contact glass 10-1c and scanned to acquire the scanned image data D1 as RGB color image at stage 1. Since the three receipt sheets are scanned in an environment where the glare of light (e.g., fluorescent light) occurs, the glare of light (e.g., fluorescent light) occurs in the background area, and the background area corresponding to the glare of light becomes brighter. The fluorescent light is white near the center of the fluorescent lamp, but the fluorescent light becomes lightly colored, such as green, at the edge of the fluorescent lamp due to the reflection on a cover of the fluorescent lamp.

Then, the application A2 performs grayscale processing and noise removal processing on the scanned image data D1 to generate image information at stage 2, and then performs the boundary extraction processing on the image information generated at stage 2 to generate image information of stage 3. At stage 3, the edge of the receipt image is extracted as a boundary line of white color, and the boundary line of white color is also extracted at a region where the glare of fluorescent light occurs, wherein the region where the glare of fluorescent light occurs is different from the receipt image region. Therefore, the application A2 further performs the binarization processing and the noise removal processing on the image information acquired at stage 3 to remove the boundary line of the region where the glare of fluorescent light occurs, which is different from the boundary line of the receipt image, to generate image information of stage 4. At stage 4, the boundary line of the region that is different from the boundary line of the receipt image region is substantially removed or erased, but as shown in stage 4, the boundary of the receipt image region is also partially erased. Therefore, the application A2 generates image information of stage 5 by performing the rectangular boundary connection processing by increasing of the white region. As a result, the boundary line of the receipt image region becomes clear at stage 5, and then the application A2 cuts out each receipt image region from the scanned image data D1 at the boundary position of each receipt image region to acquire each image of the three receipt sheets of stage 6.

The filter processing used in FIG. 14B is just one example, and the number of times of performing the filter processing, a combination of filter processing, and a method of filter processing can be changed as appropriate.

As above described, in particular, in an environment where the glare of white light such as fluorescent light occurs in the background, the region (second region) corresponding to the glare of white light may be erroneously identified as the receipt image region (first region). However, by performing the filter processing that highlights the boundary of the document image when an effect of light of an external light source is observed in the scanned image data, the boundary extraction accuracy of the receipt image region (first region) can be enhanced, and thereby an extraction of erroneous image can be suppressed, in particular, minimized. Therefore, the erroneous image, which may occur when cutting out the receipt image region can be reduced, in particular, minimized.

Figure 15A:
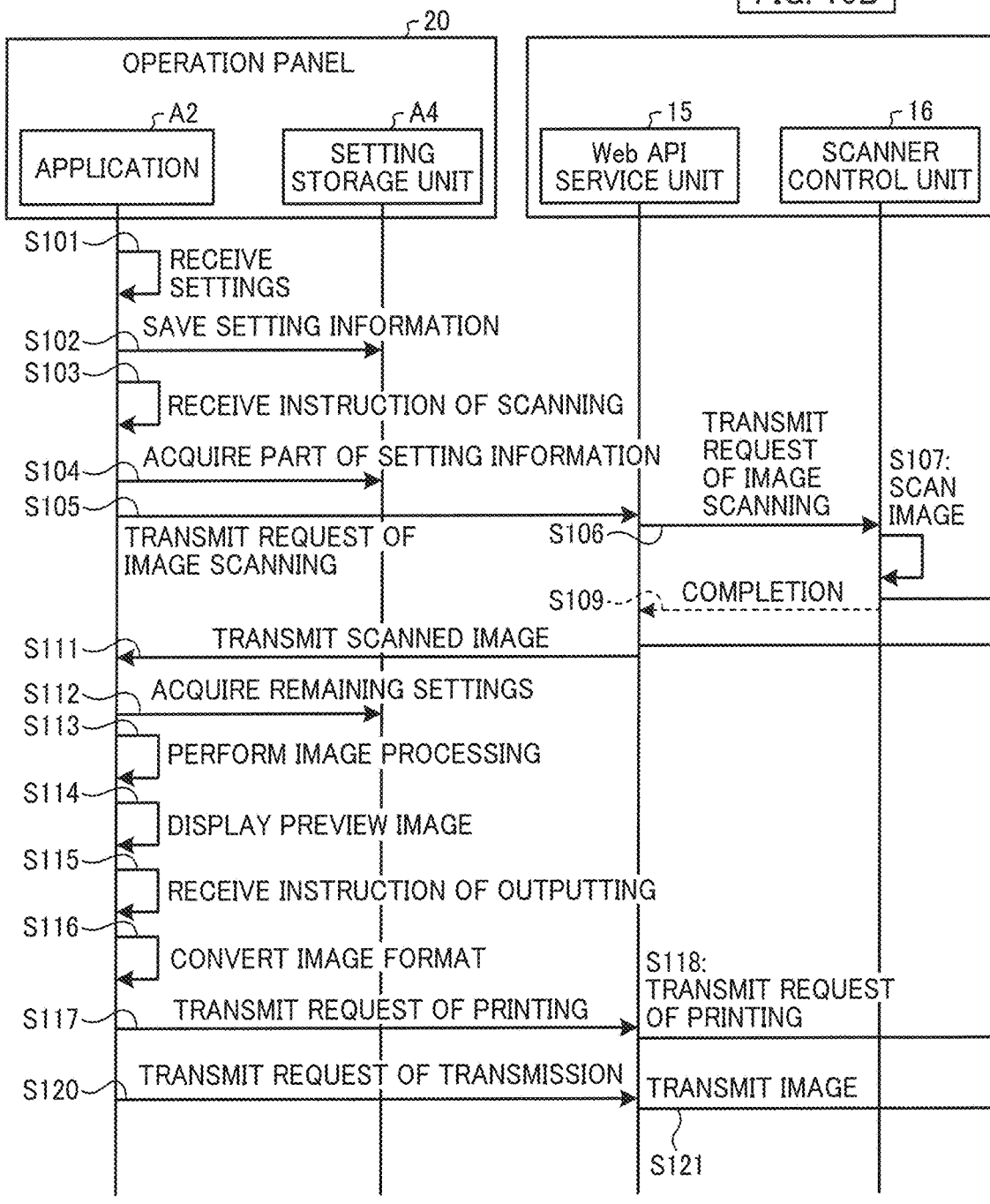

Operation of MFP:

FIGS. 15A and 15B are an example of a sequence diagram for an operation performed at the MFP 1. Since the process flow in the operation panel 20 has already been described in detail, the processing of the operation panel 20 is described concisely, and the cooperation between the operation panel 20 and the main device 10 is described in detail.

At first, the application A2 of the operation panel 20 receives the settings (S101) and then saves the received settings as the setting information B1 in the setting storage unit A4 of the operation panel 20 (S102).

Then, the application A2 of the operation panel 20 receives the pressing of the start button 1430 of specific processing (e.g., scanning) to be performed in the main device 10 (S103), acquires a part of the setting information B1 from the setting storage unit A4 after the start button 1430 is pressed (S104), and transmits a request of the image scanning to the main device 10 (S105).

Based on the request of the image scanning transmitted from the operation panel 20, in the main device 10, the web API service unit 15 activates the image scanning API 15-1 to cause the scanner control unit 16 to scan the image (S106, S107).

Then, the scanned image data D1 acquired by the scanning in step S107 is saved or stored in the image data storage unit A6 of the main device 10 (S108).

When the image scanning is completed (S109), the web API service unit 15 acquires the scanned image data D1 from the image data storage unit A6 (S110) and then transmits the acquired scanned image data D1 to the operation panel 20 (i.e., request source) via the request/response communication unit 14 (S111).

When the application A2 of the operation panel 20 acquires the scanned image data D1 from the main device 10 (S111), the application A2 acquires the remaining settings from the setting information B1 of the operation panel 20 (S112) and then performs the image processing on the acquired scanned image data D1 in accordance with the acquired remaining settings (S113).

After performing the image processing (S113), the application A2 of the operation panel 20 displays the scanned image data having received the image processing on the preview screen 1600 as a preview image (S114).

Then, when the pressing of the output button 1660 on the preview screen 1600 is received by the application A2 (S115), the application A2 converts the image format of the processed output image data D2 into a given image format in response to the pressing of the output button 1660 by the user (S116), in which the given image format can be set by the user or can be set for the application A2 in advance.

Further, if the "copy" is designated in the setting information B1, the application A2 transmits the processed output image data D2 to the main device 10 together with a request of the image forming operation (S117). In this case, in the main device 10, the web API service unit 15 activates the image forming API 15-2 based on the request and then causes the plotter control unit 17 to perform the image forming operation such as printing (S118, S119).

Further, if the "scanning" is designated in the setting information B1, the application A2 transmits the processed output image data D2 to the main device 10 together with a request of the image transmission based on the setting of a transmission destination (S120). In this case, in the main device 10, the web API service unit 15 activates the image transmission API 15-3 based on the request and then causes the communication control unit 12 of the main device 10 to transmit the output image data D2 (S121, S122).

In the first embodiment, the settings for the scanning in the main device 10 of the MFP 1 is fixed, but not limited thereto. For example, some settings included in the request, which is transmitted from the operation panel 20 to the main device 10 to instruct the main device 10 to perform the scanning, can be used at the main device 10, in which some settings, such as settings of color, resolution, density, page size, and image format used for the scanning, which are included in the request transmitted from the operation panel 20 to the main device 10, can be read by the main device 10 so that the main device 10 can generate an image based on the settings included in the request transmitted from the operation panel 20. In this case, a part of the processing included in the image processing may not be performed at the operation panel 20 but can be performed at the main device 10. Therefore, in the MFP of the first embodiment, if a part of the setting information is transmitted to the main device, the scanning is performed at the main device based on the setting information while the operation device acquires the scanned image data and then performs the remaining part of the image processing in accordance with the remaining settings of the setting information.

Further, the scanned image data acquired by using the settings fixed in the main device 10 can be stored in the main device 10. Therefore, the scanned image data acquired at the main device 10 by performing the scanning for one user can be shared with another user. For example, the scanned image data can be designated and acquired by the operation panel 20 used by each user, and each user can perform the image processing on the acquired scanned image data using the settings uniquely set for the operation panel 20 used by each user.

As described above, in the first embodiment, the image acquired by performing the scanning of document (scanned image data) can be acquired by the operation panel 20, and various settings and image processing can be performed flexibly on the scanned image data at the operation panel 20. Further, even if the image processing is performed on the same document at the operation panel 20 using settings different for each user, the number of times of scanning the document at the main device 10 is not increased, and thereby the processing load at the main device 10 can be reduced.

Further, for example, a plurality of receipt sheets can be scanned collectively and the receipt image can be easily extracted, and then an output corresponding to the request of the user can be performed.

Further, without using the document pressing plate, the scanning can be performed easily by simply arranging the receipt sheets on the scan face of the scanner. The receipt sheet, smaller than a regular sheet, has a variety of shapes, such as long and narrow. When such receipt sheets are scanned collectively, the scanning method and the outputting method may differ depending on users. Since the scanning can be performed while the document pressing plate of the scanner is being opened, the first embodiment can be applied to a user who wants to perform the scanning while the document pressing plate is being opened, and a user who wants to perform the scanning while the document pressing plate is being closed.

Further, even if the background of the scanned image data becomes darker, the boundary between the receipt image region (first region) and another region (second region) other than the receipt image region can be recognized, with which the receipt image can be extracted accurately.

Further, since an application can be added on the general-purpose OS of the operation device 20, the updating of application can be easily performed even if a new image processing function is to be added.

Variant Example 1

Hereinafter, a description is given of a variant example 1 of the first embodiment of the image processing performed at the operation panel 20. Hereinafter, a description is given of variant example 1 of the image processing performed at the operation panel 20 when the scanning is performed at the main device 10 by closing the ADF 10-1a.

As described in the first embodiment, if the scanning is performed at the main device 10 by closing the ADF 10-1a, the edge of the receipt image and the background of the receipt image become the same color (e.g., white) in the scanned image data D1, making it difficult to extract the edge of the receipt image. In such a case, a black region included in the scanned image data D1 is recognized or detected as a region of character and a rectangular frame surrounding the black region (character region) is set in the scanned image data D1, and then an image within the rectangular frame is cut out.

Figure 16:
FIG. 16 illustrates variant example 1 of image processing when scanning is performed under a closed condition.

FIG. 16 illustrates variant example 1 of the image processing when the scanning is performed while closing the ADF 10-1a. FIG. 16 shows the scanned image data D1 acquired by arranging three receipt sheets and simultaneously scanning the three receipt sheets while closing the ADF 10-1a. Each receipt image has a printing area and a white blank margin at the four sides outside the printing area, in which printed information exists within the printing area. When the three receipt sheets are scanned by closing the ADF 10-1a, the application A2 binarizes the scanned image data D1, groups the black regions (character regions) from the binarized image, and then detects the smallest rectangular frame surrounding the black region. The grouping of black regions is performed, for example, in accordance with the distance between the regions and the density of the regions. Settings such as the distance between the regions and the density of the regions are set to values such that the entire printing area can be grouped in one receipt. The rectangular dashed frame illustrated in FIG. 16 is an example of the rectangular frame. The rectangular solid frame in FIG. 16 is an actual edge of each receipt sheet. The cutting out of each receipt image from the scanned image data D1 is performed at a boundary of a rectangular frame having a given margin added to the outside of the printing area based on the rectangular dashed frame.

In variant example 1, by closing the document pressing plate to sandwich the receipt sheets between the contact face of the contact glass and the document pressing plate, curling of document such as receipt sheets can be prevented. Further, the glare of light from the upper direction of the MFP while performing the scanning can be prevented. Further, even if the background of the scanned image data becomes white, the boundary can be recognized or detected based on the character region, with which the receipt image can be extracted accurately.

Further, for example, the setting of whether the ADF 10-1a is being opened or closed when the scanning is performed at the main device 10 can be received from a user by providing a setting item indicating whether the ADF 10-1a is to be opened or closed on the setting screen 1100 and/or the preview screen 1600 at the operation panel 20.

In a case of providing the setting item indicating the ADF 10-1a is to be opened or closed on the setting screen 1100, the application A2 selects the image processing under the closed condition when the setting indicates the closed condition and executes the image processing since the application A2 performs the image processing on the scanned image data D1 in accordance with the setting set on the setting screen 1100.

Further, in a case of providing the setting item indicating the ADF 10-1a is to be opened or closed on the preview screen 1600, if the entire image is deleted due to an error in the cutting out position of the image that has been cut out based on the initial setting, the application A2 receives a change of the setting item indicating the ADF 10-1a is to be opened or closed, and then the application A2 performs the image processing on the scanned image data D1 based on the changed setting.

Variant Example 2

Hereinafter, a description is given of variant example 2 of the first embodiment of the image processing performed by the operation panel 20. As to variant example 2, each document image such as receipt image cut out from the scanned image data D1 can be rearranged at the operation panel 20. In the above described first embodiment, at the operation panel 20, the application A2 performs the image processing on the scanned image data D1, cuts out each document image such as the receipt image from the scanned image data D1, and performs the layout processing, in which each document image is arranged in an image file in a given sequence such as a sequence of the cutting out of the images.

In variant example 2, the processing of the application A2 includes processing of rearranging the arrangement order of each document image such as the receipt image based on an optical character recognition (OCR) result of the printed information included in the document image. For example, the receipt sheet includes various information, such as an issued date and time, information indicating a used facility (e.g., store name, hotel name), information indicating a purpose of use (e.g., meal, lodging, taxi), and information indicating a payment amount. In variant example 2, the application A2 receives a setting of a sequence order based on various information from a user, rearranges images of receipts based on the setting of the sequence order, and arranges the images of receipts in an image file based on the setting of the sequence order.

Figure 17:
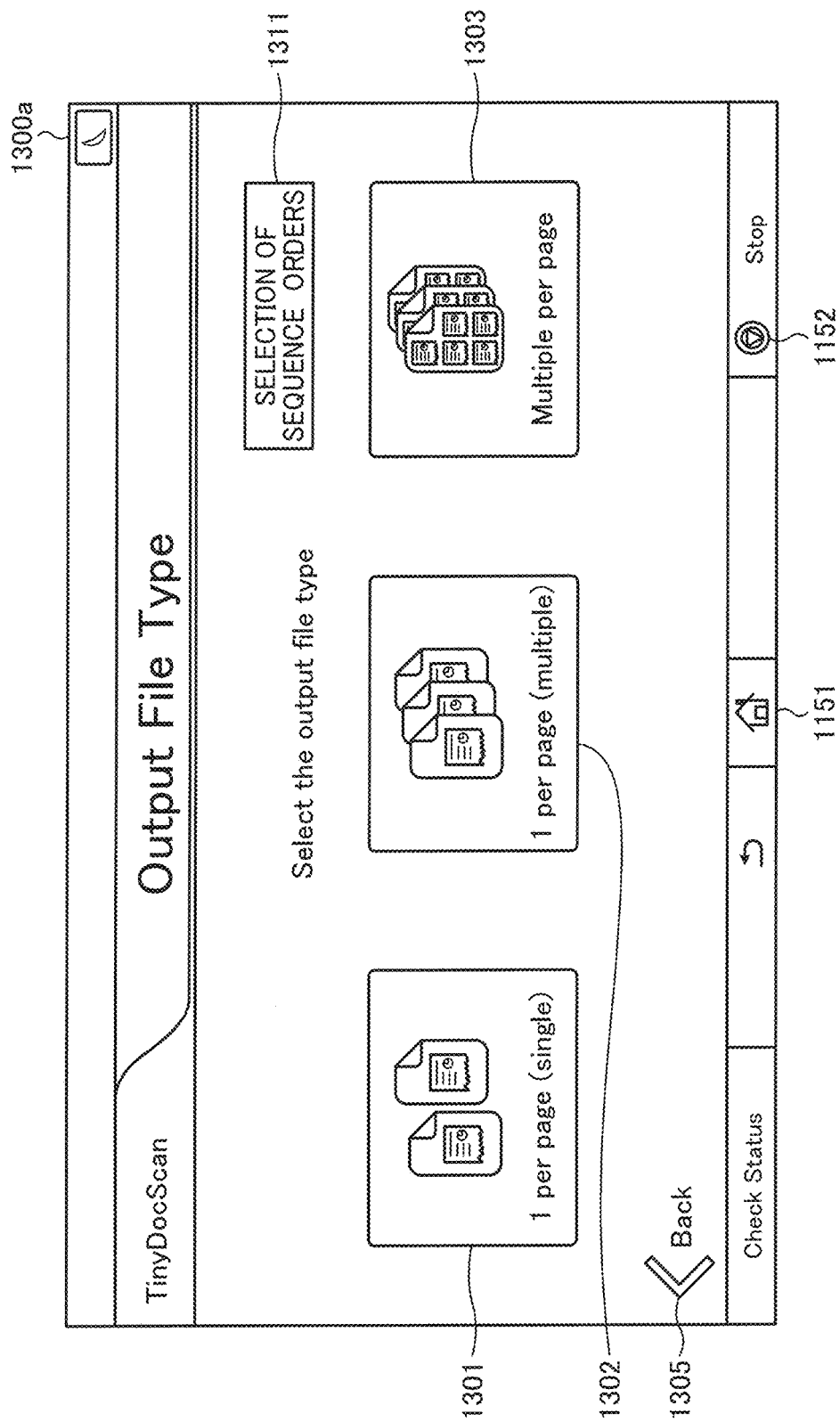
FIG. 17 illustrates an example of a file type setting screen of variant example 2.

FIG. 17 illustrates an example of the file type setting screen 1300a of variant example 2. As illustrated in FIG. 17, the file type setting screen 1300a includes, for example, a selection box 1311 for selecting sequence orders, such as date order, amount order, used facility order, and purpose of use order. The application A2 displays a list of candidates for the sequence orders, such as date order, amount order, used facility order, and purpose of use order in the selection box 1311, and then receives one of the sequence orders from the list selected and designated by a user.

Figure 18:
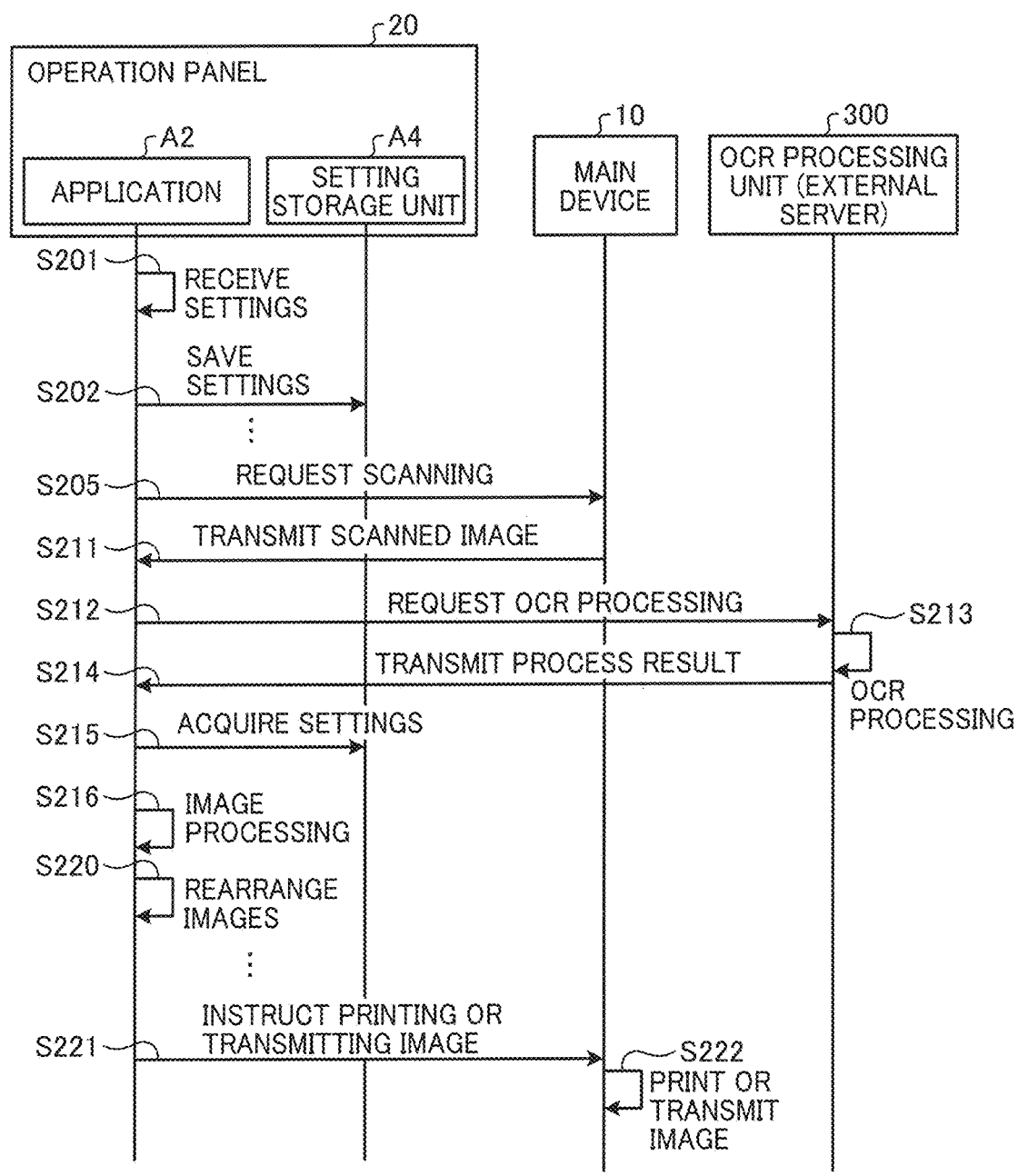
FIG. 18 illustrates an example of a sequence diagram of an operation performed at an MFP of variant example 2.

FIG. 18 illustrates an example of a sequence diagram of an operation performed at the MFP 1 of variant example 2. In variant example 2, the operation panel 20 requests an optical character recognition (OCR) processing unit 300 in an external server connected to a network to perform given processing, receives a processing result from the OCR processing unit 300, and rearranges the sequence order. Hereinafter, the portion described in the first embodiment is briefly described, and a portion different from the first embodiment is described in detail.

As illustrated in FIG. 18, at first, the application A2 of the operation panel 20 receives an input of settings related to the setting information B1 from a user (S201) and then saves the settings in the setting storage unit A4 (S202). In addition to the settings described in the first embodiment, the sequence orders, such as date order and amount order, are also received in variant example 2.

When the application A2 receives the pressing of the start button 1430 related to the scanning from the user, the application A2 requests the main device 10 to execute the scanning (S205). After the main device 10 completes the scanning, the application A2 acquires the scanned image data D1 from the main device 10 (S211).

Then, the application A2 transmits the scanned image data D1, which is a target of the OCR processing, to the OCR processing unit 300 to request the OCR processing unit 300 to perform the OCR processing on the scanned image data D1 (S212).

Then, the OCR processing unit 300 performs the requested OCR processing on the scanned image data D1 (S213) and then transmits a process result (e.g., text data) of the OCR processing to the operation panel 20, which is a source of requesting the OCR processing (S214).

When the application A2 of the operation panel 20 acquires the process result of the OCR processing (S214), the application A2 acquires the settings from the setting storage unit A4 (S215) to perform the image processing on the scanned image data D1 such as extracting each document image (e.g., receipt image) from the scanned image data D1 based on the acquired settings as above described in the first embodiment (S216).

Then, the application A2 of the operation panel 20 rearranges each of the document images based on the process result of the OCR processing of the scanned image data D1 in accordance with the settings of the sequence order received in step S202 (S220). For example, if the document includes receipt sheets and the sequence order is set by using the date order, the application A2 rearranges each of the receipt images using the date order based on each receipt image and the printed information of each receipt included in the process result of the OCR processing.

Then, the application A2 of the operation panel 20 performs the layout processing, the color conversion processing, the image format conversion processing, and/or the output processing in accordance with settings of the setting information B1 For example, the images can be arranged in the image file using the date order, can be converted to monochrome by performing the color conversion processing, and can be converted into the PDF format by the performing image format conversion processing, and then the application A2 instructs the main device 10 to perform printing the images and/or transmitting the images to a device or apparatus designated on a network (S221). Then, the main device 10 performs the printing the images and/or transmitting the images to the designated device or apparatus on the network (S222).

In variant example 2, as an example of the rearranging of the sequence order of document images, the receipt sheets are rearranged using the date order, but not limited thereto. The type of sequence order for rearranging the document images can be changed by changing or setting the sequence order depending on types of the document image.

Second Embodiment

In the first embodiment, the MFP (an example an image processing apparatuses) integrating the main device and the operation device is described. However, the combination partner of the main device 10 of the MFP 1 is not limited to the operation panel 20. For example, the main device 10 of the MFP 1 can be used with an information processing apparatus held by a user, such as a tablet terminal and a smartphone, to configure an image processing system, in which the information processing apparatus can be an operation apparatus configured to operate the MFP 1 used as the image processing apparatus.

In this configuration, software programs of a web client and the application A2 are installed on the information processing apparatus used by a user, and the application A2 is executed on the information processing apparatus. In this case too, the information processing apparatus used by the user, functioning as the operation device of the MFP 1, implements various functions. For example, the information processing apparatus is used to operate the web API of the main device 10 to request the main device 10 to perform the scanning. Then, the information processing apparatus acquires the scanned image data D1 from the main device 10 in response to the request and then performs the image processing on the acquired scanned image data D1 using the settings set by each user for the information processing apparatus to generate the output image data D2. Then, the information processing apparatus transmits the output image data D2 and requests to the MFP 1 to perform printing of the output image data D2 and/or the information processing apparatus transmits the output image data D2 to another apparatus or device.

In the image processing system of the second embodiment, the information processing apparatus such as a smart phone is typically equipped with a communication function such as Wi-Fi (registered trademark) implemented by the communication I/F 204 or the like. Therefore, in the image processing system of the second embodiment, the transmission of the output image data D2 acquired by the information processing apparatus to a designated apparatus disposed on a network can be performed using the communication function of the information processing apparatus alone without using the communication function (communication I/F 104) of the main device 10.

Further, the output image data D2 can be output to a storage medium (e.g., SD memory card, USB memory) attached to the information processing apparatus in addition to the designated apparatus disposed on the network.

Figure 19:
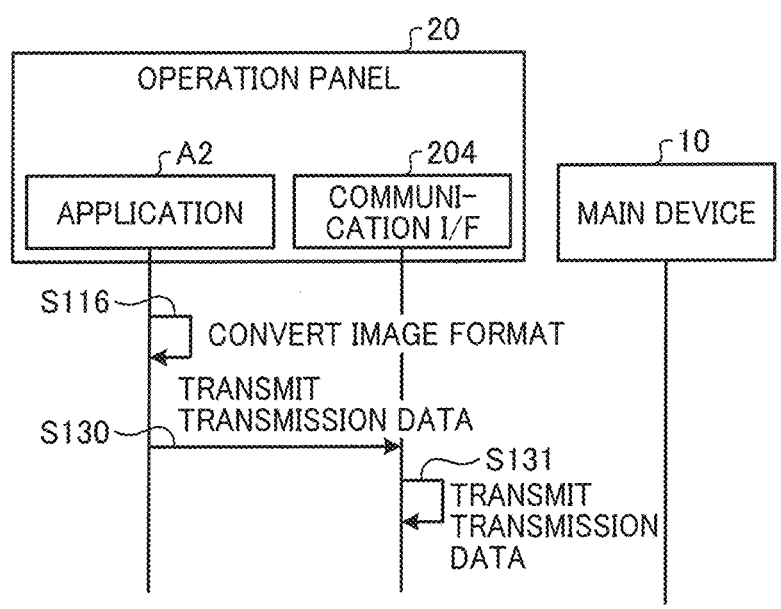
FIG. 19 illustrates an example of a sequence diagram of an operation of an image processing system of a second embodiment.

FIG. 19 illustrates an example of a sequence diagram of an operation of the image processing system of the second embodiment, in which the output image data D2 is transmitted to a designated destination using the communication function of the information processing apparatus. In FIG. 19, the information processing apparatus employs, for example, the operation panel 20, in which the processing different from that of the first embodiment is illustrated while the similar processing is omitted.

As illustrated in FIG. 19, after performing the image format conversion processing (S116), the application A2 outputs transmission data including the output image data D2, which is acquired by the image format conversion processing, to the communication I/F 204 (S130).

Then, the communication I/F 204 transmits the transmission data to an address of a transmission destination specified in the transmission data (S131).

One or more programs executable by the image processing apparatus and the information processing apparatus in the above described each embodiment and each variant example can be recorded on a recording medium readable by a computer, such as a compact disk ROM (CD-ROM), a flexible disk (FD), a compact disk recordable (CD-R), and a digital versatile disk (DVD) in a file of an installable format or a executable format.

Further, the one or more programs executable by the image processing apparatus and the information processing apparatus in the above described each embodiment and each variant example can be stored on a computer connected to a network such as the Internet, and downloaded via the network to provide the programs. Further, the one or more programs executable by the image processing apparatus and the information processing apparatus in the above described each embodiment and each variant example can be provided or distributed via a network such as the Internet.

Further, the one or more programs executable by the image processing apparatus and the information processing apparatus in the above described each embodiment and each variant example can be provided by installing the programs in the ROM or the like in advance.

Hereinafter, a description is given of an example of application scenes of the above described each embodiment and each variant example. Each embodiment and each variant example can be used for any application scene other than the below application scenes.

(1) For example, if a user has a large number of receipt sheets for settlement, the user activates the application (application A2) of the operation panel configured to operate the MFP, and uniquely sets a set of various processing related to the scanning of document and outputting the document image on the setting screen, such as the cutting the document image from the scanned image data, inclination correction processing of the document image, rearrangement processing of the document image, layout processing of the document image, and image format conversion processing of the document image. Then, the user places and arranges a number of receipt sheets on the contact glass of the scanner at the main device of the MFP and presses the start button to start the processing using the settings set via the setting screen of the operation panel. Then, the receipt image scanned by the scanner is previewed on the operation panel in accordance with the settings. For example, a number of receipt sheets placed randomly on the contact glass can be displayed on the preview screen by rearranging the number of receipt sheets by setting a narrower interval between the plurality of receipt sheets. The user deletes an image that needs to be re-scanned from the preview screen and presses the output button. This operation causes the remaining image to be printed from the plotter of the main device of the MFP or to be output as data to a designated folder.

(2) Further, by installing the application A2 on each smartphone or the like, the user can use the web API of the main device of the MFP from each smart phone to operate the MFP. Therefore, the scanned image data generated by the main device of the MFP can be acquired by each smart phone, and a series of processing from the image processing to the outputting can be flexibly performed at each smart phone in accordance with various settings set by each user.

Therefore, the processing of scanning a plurality of receipt sheets collectively, cutting out each receipt image from the entire image, and printing the image data or outputting the image data to a file can be performed easily, and thereby a user workload such as submission of expense forms at the time of expense adjustment can be reduced.

When scanning a special document such as small manuscript, an application that can flexibly cope with various usage scenes and usage of users is required, but conventionally, it has been difficult to flexibly perform various settings and image processing in accordance with such various usages.

As to the above described embodiment, the image processing apparatus, the image processing system, the method, and the program can flexibly apply various settings and image processing on an image acquired by performing the scanning operation on document.

Numerous additional modifications and variations are possible in light of the above teachings. It is therefore to be understood that, within the scope of the appended claims, the disclosure of this patent specification may be practiced otherwise than as specifically described herein.

Any one of the above-described operations may be performed in various other ways, for example, in an order different from the one described above.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An image processing apparatus, comprising:
   a main device including a scanner; and
   an operation device, configured to operate the main device and including circuitry configured to
      receive setting information and an instruction of scanning a document using the scanner, which are input to the operation device;
      store at least the setting information in a memory of the operation device, in response to receiving the setting information;
      transmit, to the main device, a request for scanning the document using the scanner, in response to receiving the instruction of scanning the document;
      acquire an image of the document, which is scanned by the scanner in the main device that receives the request for scanning the document, from the main device as scanned image data; and
      process the acquired scanned image data based on the setting information stored in the memory.

2. The image processing apparatus of claim 1, wherein the main device includes a first operating system (OS) and a scanner controller operated under the first OS, and the operation device includes a second operating system (OS) different from the first OS and an application operated under the second OS.

3. The image processing apparatus of claim 1, wherein the setting information received by the circuitry includes a first setting for performing scanning of the document using the scanner, and a second setting for performing post-processing on the acquired scanned image data.

4. The image processing apparatus of claim 3, wherein, when the operation device requests the main device to scan the document using the scanner, the operation device transmits the first setting to be used for performing the scanning of the document using the scanner.

5. The image processing apparatus of claim 3, wherein the second setting for performing the post-processing on the acquired scanned image data includes a color setting of image and a setting of image format, wherein the circuitry is further configured to perform color conversion processing on the acquired scanned image data based on the color setting, and perform image format conversion processing on the acquired scanned image data based on the setting of image format.

6. The image processing apparatus of claim 3, wherein the setting information received by the circuitry includes the second setting for performing the post-processing, which includes extraction processing for extracting a document image from the scanned image data, and layout processing for arranging the document image extracted by the extraction processing in an image file.

7. The image processing apparatus of claim 6, wherein the setting information received by the circuitry includes the second setting for performing the post-processing, including the extraction processing, which includes filter processing for highlighting a boundary of the document image when an effect of light of an external light source is observed in the scanned image data.

8. The image processing apparatus of claim 6, wherein, in response to receiving an instruction of deleting the document image extracted from the scanned image data, the circuitry is further configured to delete the document image extracted from the scanned image data.

9. The image processing apparatus of claim 1,
wherein the main device further includes an image forming unit that performs an image forming operation,
wherein, when the operation device requests the main device to perform the image forming operation, the image forming unit forms an image corresponding to the acquired scanned image data that is processed based on the setting information stored in the memory.

10. The image processing apparatus of claim 9,
wherein, when the setting information includes a setting of copying to use a copy function of the main device, the circuitry is further configured to request the main device to perform the image forming operation based on the setting of copying,
wherein, when the setting information includes a setting of scanning to use a scan function of the main device, the circuitry is further configured to output the processed scanned image data to the memory as a file or request the main device to transmit the processed scanned image data.

11. The image processing apparatus of claim 1,
wherein the operation device transmits the request for scanning the document using the scanner to the main device and a request for acquiring the scanned image data from the main device using a web application programming interface (API) of the main device.

12. The image processing apparatus of claim 6,
wherein the circuitry is further configured to rearrange a sequence order of arranging the document image extracted by the extraction processing based on a result of optical character recognition (OCR) processing performed on the scanned image data.

13. The image processing apparatus of claim 2,
wherein the circuitry is further configured to use the application of the operation device to request the main device to scan the document including a plurality of receipt sheets placed on a scan face of the scanner,
wherein the main device generates the scanned image data including images of the plurality of receipt sheets,
wherein the circuitry is further configured to acquire the scanned image data from the main device, extract each of the images of the plurality of receipt sheets from the acquired scanned image data, and perform at least any one of printing, transmitting, and storing of each of the images of the plurality of receipt sheets based on the setting information.

14. The image processing apparatus of claim 13,
wherein, when the plurality of receipt sheets is placed on the scan face of the scanner for scanning the plurality of receipt sheets by closing a document pressing plate of the scanner and sandwiching the plurality of receipt sheets between the scan face and the document pressing plate of the scanner, the circuitry is further configured to use the application to recognize a character region in the scanned image data to extract each of the images of the plurality of receipt sheets from the scanned image data.

15. The image processing apparatus of claim 13,
wherein, when the plurality of receipt sheets is placed on the scan face of the scanner for scanning the plurality of receipt sheets without closing a document pressing plate of the scanner on the scan face of the scanner and without sandwiching the plurality of receipt sheets between the scan face and the document pressing plate of the scanner, the circuitry is further configured to use the application to recognize a first region corresponding to each of the plurality of receipt sheets and a second region not corresponding to the first region on the scanned image data to extract each of the images of the plurality of receipt sheets from the scanned image data.

16. The image processing apparatus of claim 2,
wherein the first OS of the main device is an operating system (OS) dedicated to a multifunctional apparatus, the second OS of the operation device is a general-purpose operating system (OS), and the application is addable to the general-purpose operating system (OS).

17. An image processing system, comprising:
an image processing apparatus including a scanner; and
an information processing apparatus communicable with the image processing apparatus to operate the image processing apparatus, the information processing apparatus including circuitry configured to
receive setting information and an instruction of scanning a document using the scanner, which are input to the information processing apparatus;
store at least the setting information in a memory of the information processing apparatus, in response to receiving the setting information;
transmit, to the image processing apparatus, a request for scanning the document using the scanner, in response to receiving the instruction of scanning the document;
acquire an image of the document, which is scanned by the scanner in the image processing apparatus that receives the request for scanning the document, from the image processing apparatus as scanned image data; and
process the acquired scanned image data based on the setting information stored in the memory of the information processing apparatus.

18. The image processing system of claim 17,
wherein, when the setting information includes a setting of scanning to use a scan function of the image processing apparatus, the circuitry is further configured to transmit the processed scanned image data using a communication function of the information processing apparatus.

19. A method of processing image data using an operation apparatus communicable with an image processing apparatus including a scanner, the method comprising:
receiving setting information and an instruction of scanning a document using the scanner of the image processing apparatus, which are input to the operation apparatus;
storing at least the setting information in a memory of the operation apparatus, in response to receiving the setting information;
transmitting, to the image processing apparatus, a request for scanning the document using the scanner, in response to receiving the instruction of scanning the document;
acquiring an image of the document, which is scanned by the scanner in the image processing apparatus that receives the request for scanning the document, from the image processing apparatus as scanned image data; and
processing the acquired scanned image data based on the setting information stored in the memory.

* * * * *